(12) United States Patent
Nenninger et al.

(10) Patent No.: US 11,392,608 B2
(45) Date of Patent: Jul. 19, 2022

(54) ANALYZING MARKS IN VISUALIZATIONS BASED ON DATASET CHARACTERISTICS

(71) Applicant: Tableau Software, LLC, Seattle, WA (US)

(72) Inventors: Brian William Nenninger, Cambridge, MA (US); Madeleine Bradley Thompson, Somerville, MA (US); Richard Singleton Tibbetts, Arlington, MA (US); Alexander Gardner Silverstein, Somerville, MA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 16/903,967

(22) Filed: Jun. 17, 2020

(65) Prior Publication Data

US 2020/0394204 A1 Dec. 17, 2020

Related U.S. Application Data

(60) Provisional application No. 62/862,349, filed on Jun. 17, 2019.

(51) Int. Cl.
*G06F 17/00* (2019.01)
*G06F 7/00* (2006.01)
(Continued)

(52) U.S. Cl.
CPC ............ *G06F 16/26* (2019.01); *G06F 16/248* (2019.01); *G06F 16/24578* (2019.01)

(58) Field of Classification Search
CPC ... G06F 16/26; G06F 16/24578; G06F 16/248
(Continued)

(56) References Cited

U.S. PATENT DOCUMENTS

| 7,010,364 | B1 | 3/2006 | Singh et al. |
| 8,099,674 | B2 | 1/2012 | Mackinlay et al. |

(Continued)

FOREIGN PATENT DOCUMENTS

| JP | 2007249354 A | 9/2007 |
| JP | 2008217480 A | 9/2008 |

(Continued)

OTHER PUBLICATIONS

Arai, Taichi et al., "Preventing the creation of misleading graphs, Targeted learning tool," IPSJ SIG Technical Report [online], Mar. 12, 2018, vol. 2018-GN-104 No. 4, ISSN 2188-8744, pp. 1-17.
(Continued)

*Primary Examiner* — Pavan Mamillapalli
(74) *Attorney, Agent, or Firm* — John W. Branch; Branch Partners PLLC

(57) ABSTRACT

Embodiments are directed to managing visualizations of data. Visualizations that include one or more marks associated with values from a data source may be provided. A mark-of-interest may be determined from the one or more marks. Assessment models may be employed to generate assessment results for the assessment models based on the mark-of-interest and the data from the data source such that each assessment result may be associated with scores that may be based on a best fit to the data from the data source and a value of the mark-of-interest. The assessment results may be rank ordered based on their association with the scores. A report that includes the rank ordered list of the assessment results may be provided.

28 Claims, 12 Drawing Sheets

(51) Int. Cl.
 *G06F 16/26* (2019.01)
 *G06F 16/248* (2019.01)
 *G06F 16/2457* (2019.01)
(58) Field of Classification Search
 USPC .......................................................... 707/728
 See application file for complete search history.

(56) References Cited

U.S. PATENT DOCUMENTS

| | | | |
|---|---|---|---|
| 8,983,994 | B2 | 3/2015 | Neels et al. |
| 9,335,911 | B1 | 5/2016 | Elliot et al. |
| 9,361,320 | B1* | 6/2016 | Vijendra ................. G06F 16/20 |
| 9,613,086 | B1 | 4/2017 | Sherman |
| 9,779,147 | B1 | 10/2017 | Sherman et al. |
| 10,552,513 | B1 | 2/2020 | Harkare |
| 10,572,544 | B1* | 2/2020 | Zhang ................... G06F 16/383 |
| 10,572,804 | B1* | 2/2020 | Hilley ............... G06F 16/24575 |
| 10,572,859 | B1* | 2/2020 | Evans ............... H04M 3/42068 |
| 10,572,925 | B1* | 2/2020 | Roy Chowdhury ........................ G06F 16/24578 |
| 10,592,525 | B1 | 3/2020 | Khante et al. |
| 10,642,723 | B1 | 5/2020 | Krishnamoorthy |
| 10,705,695 | B1 | 7/2020 | Porath et al. |
| 10,719,332 | B1 | 7/2020 | Dwivedi et al. |
| 10,775,976 | B1 | 9/2020 | Abdul-Jawad et al. |
| 10,929,415 | B1 | 2/2021 | Shcherbakov et al. |
| 10,963,347 | B1 | 3/2021 | Chen et al. |
| 2005/0134589 | A1 | 6/2005 | Heer et al. |
| 2011/0296309 | A1 | 12/2011 | Ngan |
| 2011/0302110 | A1 | 12/2011 | Beers et al. |
| 2012/0229466 | A1 | 9/2012 | Richie et al. |
| 2012/0233182 | A1 | 9/2012 | Baudel et al. |
| 2013/0091465 | A1 | 4/2013 | Kikin-Gil et al. |
| 2013/0103677 | A1 | 4/2013 | Chakra et al. |
| 2013/0204894 | A1 | 8/2013 | Faith et al. |
| 2014/0019443 | A1* | 1/2014 | Golshan ............ G06F 16/24578 707/723 |
| 2014/0059017 | A1* | 2/2014 | Chaney ................... G06F 16/25 707/736 |
| 2014/0074889 | A1 | 3/2014 | Neels et al. |
| 2014/0344008 | A1 | 11/2014 | Gammage et al. |
| 2015/0278214 | A1 | 10/2015 | Anand et al. |
| 2016/0092408 | A1 | 3/2016 | Lagerblad et al. |
| 2016/0103908 | A1 | 4/2016 | Fletcher et al. |
| 2016/0307210 | A1 | 10/2016 | Agarwal et al. |
| 2016/0350950 | A1 | 12/2016 | Ritchie et al. |
| 2017/0061659 | A1 | 3/2017 | Puri et al. |
| 2017/0069118 | A1 | 3/2017 | Stewart |
| 2017/0124617 | A1 | 5/2017 | Spoelstra et al. |
| 2017/0132489 | A1* | 5/2017 | Simgi ..................... G06Q 50/18 |
| 2017/0140118 | A1 | 5/2017 | Haddad et al. |
| 2017/0154088 | A1 | 6/2017 | Sherman |
| 2017/0154089 | A1 | 6/2017 | Sherman |
| 2017/0220633 | A1 | 8/2017 | Porath et al. |
| 2017/0308913 | A1 | 10/2017 | Chao et al. |
| 2018/0004363 | A1 | 1/2018 | Tompkins |
| 2018/0039399 | A1 | 2/2018 | Kaltegaertner et al. |
| 2018/0121035 | A1 | 5/2018 | Filippi et al. |
| 2018/0129369 | A1 | 5/2018 | Kim et al. |
| 2018/0232405 | A1 | 8/2018 | Samara et al. |
| 2018/0267676 | A1 | 9/2018 | Glueck et al. |
| 2018/0343321 | A1 | 11/2018 | Chang |
| 2019/0012553 | A1 | 1/2019 | Maruchi et al. |
| 2019/0026681 | A1 | 1/2019 | Polli et al. |
| 2019/0043506 | A1 | 2/2019 | Rivkin et al. |
| 2019/0102425 | A1 | 4/2019 | Obeidat |
| 2019/0108272 | A1 | 4/2019 | Talbot et al. |
| 2019/0129964 | A1 | 5/2019 | Corbin, II et al. |
| 2019/0130512 | A1 | 5/2019 | Kuhn |
| 2019/0179621 | A1* | 6/2019 | Salgado ................... G06F 8/31 |
| 2019/0188333 | A1 | 6/2019 | Williams et al. |
| 2019/0213608 | A1 | 7/2019 | Ouyang et al. |
| 2019/0355447 | A1 | 11/2019 | Barkol et al. |
| 2020/0012939 | A1 | 1/2020 | Hu et al. |
| 2020/0019546 | A1 | 1/2020 | Luo et al. |
| 2020/0050636 | A1* | 2/2020 | Datla ........................ G06N 5/04 |
| 2020/0066397 | A1 | 2/2020 | Rai et al. |
| 2020/0104731 | A1 | 4/2020 | Oliner et al. |
| 2020/0233559 | A1 | 7/2020 | Rueter et al. |
| 2020/0320462 | A1 | 10/2020 | Wang et al. |
| 2020/0372472 | A1 | 11/2020 | Kenthapadi et al. |
| 2021/0049143 | A1 | 2/2021 | Jacinto et al. |
| 2021/0110288 | A1 | 4/2021 | Poothiyot et al. |

FOREIGN PATENT DOCUMENTS

| | | |
|---|---|---|
| JP | 2009-534752 A | 9/2009 |
| JP | 2017174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Barowy, Daniel W. et al., "ExceLint: Automatically Finding Spreadsheet Formula Errors," In Proceedings of the ACM Programming Languages 2, OOPSLA, 2018, Article 148, pp. 1-26.

Barowy, Daniel W. et al., "CheckCell: Data Debugging for Spreadsheets," ACM SIGPLAN Notices, 2014, vol. 49, Iss. 10, pp. 507-523.

Donaldson, Alastair F. et al., "Automated Testing of Graphics Shader Compilers," In Proceedings of the ACM Programming Languages 1, OOPSLA, 2017, Article 93, pp. 1-29.

Dragicevic, Pierre et al., "Increasing the Transparency of Research Papers with Explorable Multiverse Analyses," In Proceedings of The ACM CHI Conference on Human Factors in Computing Systems, 2019, Glasgow, United Kingdom, pp. 1-16.

Gotz, David et al., "Visualization Model Validation via Inline Replication," Information Visualization, 2019, pp. 405-425.

Guderlei, Ralph et al., "Statistical Metamorphic Testing—Testing Programs With Random Output by Means of Statistical Hypothesis Tests and Metaphoric Testing," In Seventh International Conference on Quality Software, IEEE, 2007, pp. 404-409.

Guo, Yue et al., "What You See is Not What You Get!: Detecting Simpson's Paradoxes During Data Exploration," In ACM SIGMOD Workshop on Human-in-the-Loop Data Analytics (HILDA), 2017, Article 2, pp. 1-5.

Hynes, Nick et al., "The Data Linter: Lightweight, Automated Sanity Checking for ML Data Sets," In NIPS: Workshop on Systems for ML and Open Source Software, 2017, pp. 1-7.

Kindlmann, Gordon et al., "An Algebraic Process for Visualization Design," IEEE Transactions on Visualization and Computer Graphics, 2014, vol. 20, No. 12, pp. 2181-2190.

Kirby, Robert M. et al., "The Need for Verifiable Visualization," IEEE Computer Graphics and Applications, 2008, vol. 28, No. 5, pp. 78-83.

McNutt, Andrew et al., "Linting for Visualization: Towards a Practical Automated Visualization Guidance System," In VisGuides: 2nd Workshop on the Creation, Curation, Critique and Conditioning of Principles and Guidelines in Visualization, 2018, pp. 1-14.

Muşlu, Kivanç et al., "Preventing Data Errors with Continuous Testing," In Proceedings of the 2015 International Symposium on Software Testing and Analysis, ACM, 2015, pp. 373-384.

Salimi, Babak et al., "Bias in OLAP Queries: Detection, Explanation, and Removal." In Proceedings of the 2018 International Conference on Management of Data, ACM, 2018, pp. 1021-1035.

Tang, Nan et al., "Towards Democratizing Relational Data Visualization," In Proceedings of the 2019 International Conference on Management of Data, ACM, 2019, pp. 2025-2030.

Wall, Emily et al., "Warning, Bias May Occur: A Proposed Approach to Detecting Cognitive Bias in Interactive Visual Analytics," In 2017 IEEE Conference on Visual Analytics Science and Technology (VAST), IEEE, 2017, pp. 104-115.

Wickham, Hadley et al., "Graphical Inference for Infovis," IEEE Transactions on Visualization and Computer Graphics 16, 2010, pp. 973-979.

(56) References Cited

OTHER PUBLICATIONS

Anand, Anushka et al., "Automatic Selection of Partitioning Variables for Smail Mulitiple Displays," IEEE Transactions on Visualization and Computer Graphics, 2015, vol. 22, Iss. 1, pp. 669-677.
Anonymous, "Glitchart: When charts attack," https://glitch-chart.tumblr.com/, 2019, Accessed Feb. 5, 2020, pp. 1-1.
Armstrong, Zan et al., "Visualizing Statistical Mix Effects and Simpson's Paradox," IEEE Transactions on Visualization and Computer Graphics, 2014, vol. 20, No. 12, pp. 2132-2141.
Barr, Earl T. et al., "The Oracle Problem in Software Testing: A Survey," IEEE Transactions on Software Engineering, 2015, vol. 41, No. 5, pp. 507-525.
Binnig, Carsten et al., "Toward Sustainable Insights, or Why Polygamy is Bad for You," In Proceedings of the 8th Biennial Conference on Innovative Data Systems Research, 2017, pp. 1-7.
Borland, David et al., "Contextual Visualization," IEEE Computer Graphics and Applications, 2018, vol. 38, No. 6, pp. 17-23.
Bresciani, Sabrina et al., "The Risks of Visualization," Identität und Vielfalt der Kommunikations-wissenschaft, 2009, pp. 1-22.
Bresciani, Sabrina et al., "The Pitfalls of Visual Representations: A Review and Classification of Common Errors Made While Designing and Interpreting Visualizations," SAGE Open, 2015, pp. 1-14.
Cairo, Alberto, "Graphic Lies, Misleading Visuals," In New Challenges for Data Design, Springer, 2015, pp. 103-116.
Chi, Ed Huai-Hsin, "A Taxonomy of Visualization Techniques Using the Data State Reference Model," In IEEE Symposium on Information Visualizations, 2000, pp. 69-75.
Chiw, Charisee et al., "DATm: Diderot's Automated Testing Model," In IEEE/ACM 12th International Workshop on Automation of Software Testing (AST), IEEE, 2017, pp. 45-51.
Cleveland, William S. et al., "Variables on Scatterplots Look More Highly Correlated When the Scales are Increased," Science, 1982, vol. 216, No. 4550, pp. 1138-1141.
Cockburn, Andy et al., "Hark No More: On the Preregistration of CHI Experiments," In Proceedings of the 2018 CHI Conference on Human Factors in Computing Systems, ACM, 2018, pp. 1-12.
Correll, Michael, "Ethical Dimensions of Visualization Research," In Proceedings of the 2019 CHI Conference on Human Factors In Computing Systems, ACM, 2019, pp. 1-13.
Correll, Michael et al., "Truncating the Y-Axis: Threat or Menace?," arXiv preprint arXiv:1907.02035, 2019, pp. 1-12.
Correll, Michael et al., "Surprise! Bayesian Weighting for De-Biasing Thematic Maps," IEEE Tranactions on Visualization and Computer Graphics, 2016, pp. 1-10.
Correll, Michael et al., "Black Hat Visualization," In IEEE VIS; Workshop on Dealing With Cognitive Biases in Visualizations, 2017, pp. 1-4.
Correll, Michael et al., "Looks Good To Me: Visualizations As Sanity Checks," IEEE Transactions on Visualizations and Computer Graphics, 2018, pp. 1-10.
Diehl, Alexandra et al., "VisGuides: A Forum for Discussing Visualization Guidelines," In Proceedings of the Eurographics/IEEE VGTC Conference on Visualization: Short Papers, Eurographics Asscociation, 2018, pp. 61-65.
D'Ignazio, Catherine et al., "Feminist Data Visualization," In IEEE VIS: Workshop on Visualization for the Digital Humanities (VIS4DH), 2016, pp. 1-5.
Dimara, Evanthia et al., "A Task-Based Taxonomy of Cognitive Biases for Information Visualization," IEEE Transactions on Visualization and Computer Graphics, 2018, pp. 1-21.
Dörk, Marian et al., "Critical InfoVis: Exploring the Politics of Visualization," In 2013 ACM SIGCHI Conference on Human Factors in Computing Systems, Extended Abstracts, 2013, pp. 2189-2198.
Efron, Bradley, "Bootstrap Methods: Another Look at the Jackknife," The Annals of Statistics, 1979, vol. 7, No. 1, pp. 1-26.
Filipov, Velitchko et al., "CV3: Visual Exploration, Assessment, and Comparison of CVs," In Computer Graphics Forum, Wiley Online Library, 2019, pp. 107-118.
Ford, Brian, "Write-Good: Naive Linter for English Prose," https://github.com/btford/write-good Accessed: Feb. 6 2020, pp. 1-6.
Gelman, Andrew et al., "The garden of forking paths: Why multiple comparisons can be a problem, even when there is no "fishing expedition" or "p-hacking" and the research hypothesis was posited ahead of time," Department of Statistics, Columbia University, 2013, pp. 1-17.
World Bank Group, "World Development Indicators," http://datatopics.worldbank.org/world-development-indicators/, 2020, pp. 1-6.
Haraway, Donna, "Situated Knowledges: The Science Question in Feminism and the Privilege of Partial Perspective," Feminist Studies, 1988, vol. 14, No. 3, pp. 575-599.
Heer, Jeffrey, "Agency plus automation: Designing artificial intelligence into interactive systems," In Proceedings of the National Academy of Sciences, 2019, vol. 116, No. 6, pp. 1844-1850.
Heer, Jeffrey, "Visualization is Not Enough," https://homes.cs.washington.edu/~jheer/talks/EuroVis2019-Capstone.pdf EuroVis Capstone, 2019, pp. 1-113.
Heer, Jeffrey et al., "Multi-Scale Banking to 45 Degrees," IEEE Transactions on Visualization and Computer Graphics, 2006, vol. 12, No. 5, pp. 701-708.
Hibbard, William L. et al., "A Lattice Model for Data Display," In Proceedings of the Conference on Visualization, IEEE Computer Society Press, 1994, pp. 310-317.
Hofmann, Heike et al., "Graphical Tests for Power Comparison of Competing Designs," IEEE Transactions on Visualization and Computer Graphics, 2012, vol. 18, No. 12, pp. 2441-2448.
Huff, Darrell, "How to Lie with Statistics," WW Norton & Company, 31st Printing, 1993, pp. 1-141.
Hullman, Jessica et al., "Visualization Rhetoric: Framing Effects in Narrative Visualization," IEEE Transaction on Visualization and Computer Graphics, 2011, vol. 17, No. 12, pp. 2231-2240.
Isenberg, Tobias et al., "A Systematic Review on the Practice of Evaluating Visualization," IEEE Transactions on Visualization and Computer Graphics, 2013, vol. 19, No, 12, pp. 2818-2827.
Jannah, Hassan M., "MetaReader: A Dataset Meta-Exploration and Documentation Tool," 2014, pp. 1-11.
Johnson, Stephen C., "Lint, a C Program Checker," Citeseer, 1977, pp. 1-12.
Kandel, Sean et al., "Research directions in data wrangling: Visualizations and transformations for usable and credible data," Information Visualization, 2011, vol. 10, No. 4, pp. 271-288.
Kandel, Sean et al., "Profiler: Integrated Statistical Analysis and Visualization for Data Quality Assessment," In Proceedings of the International Working Conference on Advanced Visual Interfaces, ACM, 2012, pp. 547-554.
Kim, Won et al., "A Taxonomy of Dirty Data," Data Mining and Knowledge Discovery, 2003, vol. 7, No. 1, pp. 81-89.
Kindlmann, Gordon et al., "Algebraic Visualization Design for Pedagogy," IEEE VIS: Workshop on Pedagogy of Data Visualization, 2016, pp. 1-5.
Kong, Ha-Kyung et al., "Frames and Slants in Titles of Visualizations on Controversial Topics," In Proceedings of the 2018 CHI Conference on Human Factors in Computing Systems, ACM, 2018, pp. 1-12.
Kong, Ha-Kyung et al., "Trust and Recall of Information across Varying Degrees of Title-Visualization Misalignment," In Proceedings of the 2019 CHI Conference on Human Factors In Computing Systems, ACM, 2019, 346, pp. 1-13.
Amperser Labs, "Proselint: A linter for prose," http://proselint.com/, Accessed: Feb. 10, 2020, pp. 1-3.
Lavigne, Sam et al., "Predicting Financial Crime: Augmenting the Predictive Policing Arsenal," arXiv preprint arXiv:1704.07826, 2017, pp. 1-8.
Ziemkiewicz, Caroline et al., "Embedding Information Visualization Within Visual Representation," In Advances in Information and Intelligent Systems, Springer, 2009, pp. 1-20.
Zhou, Zhi Quan et al., "Metamorphic Testing of Driverless Cars," Communications of the ACM, 2019, vol. 62, No. 3, pp. 61-67.
Zhao, Zheguang et al., "Controlling False Discoveries During Interactive Data Exploration," In proceedings of the 2017 International Conference on Management of Data, ACM, 2016, pp. 527-540.

(56) References Cited

OTHER PUBLICATIONS

Lundgard, Alan et al., "Sociotechnical Considerations for Accessible Visualization Design," IEEE Transactions on Visualization and Computer Graphics, 2019, pp. 1-5.
Lunzer, Aran et al., "It Ain't Necessarily So: Checking Charts for Robustness," IEEE VisWeek Poster Proceedings, 2014, pp. 1-3.
Lupi, Giorgia, "Data Humanism: The Revolutionary Future of Data Visualization," Print Magazine 30, 2017, pp. 1-10.
MacKinlay, Jock et al., "Show Me: Automatic Presentation for Visual Analysis," IEEE Transactions on Visualization and Computer Graphics, 2007, vol. 13, No. 6, pp. 1137-1144.
Matejka, Justin et al., "Same Stats, Different Graphs: Generating Datasets with Varied Appearance and Identical Statistics Through Simulated Annealing," In Proceedings of the 2017 CHI Conference on Human Factors in Computing Systems, ACM, 2017, pp. 1290-1294.
Mayorga, Adrian et al., "Splatterplots: Overcoming Overdraw in Scatter Plots," IEEE Transactions on Visualization and Computer Graphics, 2013, vol. 19, No, 9, pp. 1526-1538.
Mayr, Eva et al., "Trust in Information Visualization," In EuroVis Workshop on Trustworthy Visualization (TrustVis), Robert Kosara, Kai Lawonn, Lars Linsenm, and Noeska Smit (Eds.), The Eurographics Association, 2019, pp. 1-5.
Micallef, Luana et al., "Towards Perceptual Optimization of the Visual Design of Scatterplots," IEEE Transactions on Visualization and Computer Graphics, 2017, vol. 23, No. 6, pp. 1-12.
Moere, Andrew Vande, "Towards Designing Persuasive Ambient Visualization," In Issues in the Design & Evaluation of Ambient Information Systems Workshop, Citeseer, 2007, pp. 48-52.
Moritz, Dominik et al., "Formalizing Visualization Design Knowledge as Constraints: Actionable and Extensible Models in Draco," IEEE Transactions on Visualization and Computer Graphics, 2018, vol. 25, No. 1, pp. 438-448.
Newman, George E. et al., "Bar graphs depicting averages are perceptually misinterpreted: The within-the-bar bias," Psychonomic Bulletin & Review, 2012, vol. 19, No. 4, pp. 601-607.
Onuoha, Mimi, "On Missing Data Sets,"https://github.com/mimionuoha/missing-datasets, Accessed: Feb. 10, 2020, pp. 1-3.
Pandey, Anshul Vikram et al., "How Deceptive are Deceptive Visualizations?: An Empirical Analysis of Common Distortion Techniques," In Proceedings of the 33rd Annual ACM Conference on Human Factors in Ciomputing Systems, ACM, 2015, pp. 1469-1478.
Pirolli, Peter et al., "The Sensemaking Process and Leverage Points for Analyst Technology as Identified Through Cognitive Task Analysis," In Proceedings of International Conference on Intelligence Analysis, 2005, vol. 5, pp. 1-6.
Plaisant, Catherine, "Information Visualization and the Challenge of Universal Usability," In Exploring Geovisualization, Elsevier, 2005, pp. 1-19.
Pu, Xiaoying et al., "The Garden of Forking Paths in Visualization: A Design Space for Reliable Exploratory Visual Analyics: Position Paper," In IEEE VIS: Evaluation and Beyond—Methodological Approaches for Visualization (BELIV), IEEE, 2018, pp. 37-45.
Qu, Zening et al., "Keeping Multiple Views Consistent: Constraints, Validations, and Exceptions in Visualization Authoring," IEEE Transactions on Visualization and Computer Graphics, 2017, vol. 24, No. 1, pp. 468-477.
Raman, Vijayshankar et al., "Potter's Wheel: An Interactive Data Cleaning System," In Proceedings of the 27th International Conference on Very Large Data Bases, 2001, vol. 1, pp. 381-390.
Redmond, Stephen, "Visual Cues in Estimation of Part-To-Whole Comparisons," IEEE Transactions on Visualization and Computer Graphics, 2019, pp. 1-6.
Ritchie, Jacob et al., "A Lie Reveals the Truth: Quasimodes for Task-Aligned Data Presentation," In Proceedings of the 2019 CHI Conference on human Factors in Computing Systems, ACM, 193, 2019, pp. 1-13.
Rogowitz, Bernice E. et al., "The "Which Blair Project": A Quick Visual Method for Evaluating Perceptual Color Maps," In IEEE Visualization 2001, Proceedings, 2001, pp. 183-190.
Rogowitz, Bernice E. et al., "How Not to Lie with Visualization," Computers in Physics, 1996, vol. 10, No. 3, pp. 268-273.
Rosling, Hans et al., "Health advocacy with Gapminder animated statistics," Journal of Epidemiology and Global Health, 2011, vol. 1, No. 1, pp. 11-14.
Sacha, Dominik et al., "The Role of Uncertainty, Awareness, and Trust in Visual Analytics," IEEE Transactions on Visualization and Computer Graphics, 2016, vol. 22, No. 1, pp. 240-249.
Satyanarayan, Arvind et al., "Vega-Lite: A Grammar of Interactive Graphics," IEEE Transactions on Visualization and Computer Graphics, 2016, vol. 23, No. 1, pp. 341-350.
Segura, Sergio et al., "A Survey on Metamorphic Testing," IEEE Transactions on Software Engineering, 2016, vol. 42, No. 9, pp. 805-824.
Song, Hayeong et al., "Where's My Data? Evaluating Visualizations with Missing Data," IEEE Transactions on Visualization and Computer Graphics, 2018, vol. 25, No. 1, pp. 914-924.
Srinivasan, Arjun et al., "Augmenting Visualizations with Interactive Data Facts to Facilitate Interpretation and Communication," IEEE Transactions on Visualization and Computer Graphics, 2018, vol. 25, No. 1, pp. 672-681.
Stonebraker, Michael et al., "Data Curation at Scale: The Data Tamer System," In Proceedings of the 6th Biennial Conference on Innovative Data Systems Research, 2013, pp. 1-10.
Szafir, Danielle Albers, "The Good, the Bad, and the Biased: Five Ways Visualizations Can Mislead (and How to Fix Them)," ACM Interactions, 2018, vol. 25, No. 4, pp. 26-33.
Tableau, "Tableau Prep," https://www.tableau.com.products/prep/, 2020, pp. 1-13.
Trifacta, "Trifacta," https://www.trifacta.com/, 2020, pp. 1-8.
Trulia, "New York Real Estate Market Overview," https://www.trulia.com/real_estate/New_York-New_York/, 2020, Accessed: Feb. 11, 2020, pp. 1-3.
Valdez, André Calero et al., "A Framework for Studying Biases in Visualization Research," 2017, pp. 1-5.
Van Wijk, Jarke J., "The Value of Visualization," In VIS 05, IEEE Visualization, 2005, IEEE, pp. 79-86.
VanderPlas, Jacob et al., "Altair: Interactive Statistical Visualizations for Python," The Journal of Open Source Software, 2018, vol. 3, No. 32, pp. 1-2.
Veras, Rafael et al., "Discriminability Tests for Visualization Effectiveness and Scalability," IEEE Transactions on Visualization and Computer Graphics, 2019, pp. 1-10.
Vickers, Paul et al., "Understanding Visualization: A Formal Foundation using Category Theory and Semiotics," IEEE Transactions on Visualization and Computer Graphics, 2012, vol. 19, No. 6, pp. 1-14.
Wainer, Howard, "How to Display Data Badly," The American Statistician, 1984, vol. 38, No. 2, pp. 137-147.
Wang, Pei et al., "Uni-Detect: A Unified Approach to Automated Error Detection in Tables," In Proceedings of the 2019 International Conference on Management of Data, ACM, 2019, pp. 811-828.
Whitworth, Brian, "Polite Computing," Behaviour & Information Technology, 2005, vol. 24, No. 5, pp. 353-363.
Wood, Jo et al., "Design Exposition with Literate Visualization," IEEE Transactions on Visualization and Computer Graphics, 2018, vol. 25, No. 1, pp. 759-768.
Wu, Eugene et al., "Scorpion: Explaining Away Outliers in Aggregate Queries," Proceedings of the VLDB Endowment, 2013, vol. 6, No. 8, pp. 553-564.
Xiong, Cindy et al., "Illusion of Causality in Visualized Data," arXiv preprint arXiv:1908.00215, 2019, pp. 1-10.
Xiong, Cindy et al., "The Curse of Knowledge in Visual Data Communication," IEEE Tranactions on Visualization and Computer Graphics, 2019, pp. 1-12.
Zgraggen, Emanuel et al., "Investigating the Effect of the Multiple Comparisons Problem in Visual Analysis," In Proceedings of the 2018 CHI Conference on Human Factors in Computing Systems, ACM, 2018, pp. 1-12.

(56) References Cited

OTHER PUBLICATIONS

International Search Report and Written Opinion for International Patent Application No. PCT/US2020/050722 dated Nov. 24, 2020, pp. 1-6.
Office Communication for U.S. Appl. No. 17/014,832 dated Apr. 27, 2021, pp. 1-27.
Negash, Solomon, "Business Intelligence," Communications of the Association for Information Systems, 2004, vol. 13, pp. 177-195.
Eckerson, Wayne W., "Performance Dashboards Measuring, Monitoring, and Managing Your Business," Business Book Summaries, 2012, pp. 1-11.
Lizotte-Latendresse, Simon et al., "Implementing self-service business analytics supporting lean manufacturing: A state-of-the-art review," 16th IFAC Symposium—Incom, 2018, pp. 1143-1148.
Gröger, Christoph et al., "The Operational Process Dashboard for Manufacturing," SciVerse ScienceDirect, Procedia CIRP 7, 2013, pp. 205-210.
Yigitbasioglu, Ogan M. et al., "A review of dashboards in performance management: Implications for design and research," International Journal of Accounting Information Systems, 2012, vol. 13, pp. 41-59.
Adam, Frédéric et al., "Developing Practical Decision Support Tools Using Dashboards of Information," In: Handbook on Decision Support Systems 2. International Handbooks Information System, Springer, Berlin, Heidelberg, 2008, pp. 151-173.
Passlick, Jens et al., "A Self-Service Supporting Business Intelligence and Big Data Analytics Architecture," Proceedings of the 13th International Conference on Wirtschaftsinformatik, 2017, pp. 1126-1140.
Shneiderman, Ben, "The Eyes Have It: A Task by Data Type Taxonomy for Information Visualizations," Proc. Visual Languages, 1996, pp. 1-9.
Alpar, Paul et al., "Self-Service Business Intelligence," Business & Information Systems Engineering, 2016, vol. 58, pp. 151-155.
Kaur, Pawandeep et al., "A Review on Visualization Recommendation Strategies," In Proceedings of the 12th International Joint Conference on Computer Vision, Imaging and Computer Graphics Theory and Applications, 2017, vol. 3, pp. 266-273.
Hoang, Duong Thi Anh et al., "Dashboard by-Example: A Hypergraph-based Approach to On-demand Data warehousing systems," IEEE International Conference on Systems, Man, and Cybernetics, 2012, pp. 1853-1858.
Zhang, Shuo et al., "Ad Hoc Table Retrieval using Semantic Similarity," IW3C2, Creative Commons CC BY 4.0 License, 2018, pp. 1553-1562.
Key, Alicia et al., "VizDeck: Self-Organizing Dashboards for Visual Analytics," SIGMOD International Conference on Management of Data, 2012, pp. 681-684.
MacKinlay, Jock, "Automating the Design of Graphical Presentations of Relational Information," ACM Transactions on Graphics, 1986, vol. 5, No. 2, pp. 110-141.
Touma, Rizkallah et al., "Supporting Data Integration Tasks with Semi-Automatic Ontology Construction," DOLAP '15: Proceedings of the ACM Eighteenth International Workshop on Data Warehousing and OLAP, 2015, pp. 89-98.
Mazumdar, Suvodeep et al., "A Knowledge Dashboard for Manufacturing Industries," ESWC 2011 Workshops, LNCS 7117, 2012, pp. 112-124.
Matera, Maristella et al., "PEUDOM: A Mashup Platform for the End User Development of Common Information Spaces," ICWE 2013, LNCS 7977, 2013, pp. 494-497.
Theorin, Alfred et al., "An Event-Driven Manufacturing Information System Architecture," IFAC/IEEE Symposium on Information Control Problems in Manufacturing, 2015, pp. 1-9.
Lennerholt, Christian et al., "Implementation Challenges of Self Service Business Intelligence: A Literature Review," Proceedings of the 51st Hawaii International Conference on System Sciences, 2018, pp. 5055-5063.
Elias, Micheline et al., "Exploration Views: Understanding Dashboard Creation and Customization for Visualization Novices," Interact 2011, Part IV, LNCS 6949, 2011, pp. 274-291.
Buccella, Agustina et al., "Ontology-Based Data Integration Methods: A Framework for Comparison," Revista Colombiana de Computación, 2005, vol. 6, No. 1, pp. 1-24.
Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.
Palpanas, Themis et al., "Integrated model-driven dashboard development," Information Systems Frontiers, 2007, vol. 9, pp. 1-14.
Resnick, Marc L., "Building The Executive Dashboard," Proceedings of the Human Factors and Ergonomics Society 47th Annual Meeting, 2003, pp. 1639-1643.
Sarikaya, Alper et al., "What Do We Talk About When We Talk About Dashboards?," IEEE Transactions on Visualization and Computer Graphics, 2018, pp. 1-11.
Boury-Brisset, Anne-Claire, "Ontology-based Approach for Information Fusion," Proceedings of the Sixth International Conference on Information Fusion, 2003, vol. 1, pp. 522-529.
Park, Laurence A. F. et al., "A Blended Metric for Multi-label Optimisation and Evaluation," ECML/PKDD, 2018, pp. 1-16.
Kintz, Maximilien, "A Semantic Dashboard Description Language for a Process-oriented Dashboard Design Methodology," 2nd International Workshop on Mode-based Interactive Ubiquitous Systems, 2012, pp. 1-6.
Bergamaschi, Sonia et al., "A Semantic Approach to ETL Technologies," Data & Knowledge Engineering, 2011, pp. 1-24.
Office Communication for U.S. Appl. No. 16/368,390 dated Mar. 2, 2020, pp. 1-8.
International Search Report and Written Opinion for International Patent Application No. PCT/US2020/057780 dated Feb. 2, 2021, pp. 1-8.
Office Communication for U.S. Appl. No. 16/732,027 dated Jun. 14, 2021, pp. 1-22.
Office Communication for U.S. Appl. No. 16/915,963 dated Jul. 19, 2021, pp. 1-9.
International Search Report and Written Opinion for PCT/US2020/038157 dated Oct. 6, 2020, pp. 1-8.
Office Communication for U.S. Appl. No. 17/014,882 dated Nov. 2, 2021, pp. 1-33.
International Search Report and Written Opinion for International Patent Application No. PCT/US2021/043167 dated Oct. 26, 2021, pp. 1-7.
International Search Report and Written Opinion for International Patent Application No. PCT/US2021/043177 dated Oct. 26, 2021, pp. 1-8.
Office Communication for U.S. Appl. No. 16/732,027 dated Nov. 15, 2021, pp. 1-25.
International Search Report and Written Opinion for International Patent Application No. PCT/US2021/049229 dated Nov. 16, 2021, pp. 1-8.
Office Communication for U.S. Appl. No. 16/944,064 dated Nov. 26, 2021, pp. 1-50.
Office Communication for U.S. Appl. No. 16/672,130 dated Jan. 5, 2022, pp. 1-32.
Office Communication for U.S. Appl. No. 16/915,963 dated Jan. 7, 2022, pp. 1-9.
Office Communication for U.S. Appl. No. 17/014,882 dated Jan. 25, 2022, pp. 1-6.
Wu, Aoyu et al., "MultiVision: Designing Analytical Dashboards with Deep Learning Based Recommendation," IEEE, arXiv preprint, arXiv:2107.07823, Jul. 2021, pp. 1-11.
Shi, Danqing et al., "Talk2Data: High-Level Question Decomposition for Data-Oriented Question and Answering," arXiv preprint, arXiv:2107.14420, Jul. 2021, pp. 1-11.
Wang, Yun et al., "DataShot: Automatic Generation of Fact Sheets from Tabular Data," IEEE Transactions on Visualization and Computer Graphics, vol. 26, No. 1, Aug. 2019, pp. 1-11.

(56) References Cited

OTHER PUBLICATIONS

Wang Baldonado, Michelle Q. et al., "Guidelines for Using Multiple Views in Information Visualization," AVI '00, In Proceedings of the Working Conference on Advanced Visual Interfaces, May 2000, pp. 1-10.

Chen, Xi et al., "Composition and Configuration Patterns in Multiple-View Visualizations," arXiv preprint, arXiv:2007.15407, Aug. 2020, pp. 1-11.

Crisan, Anamaria et al., "GEViTRec: Data Reconnaissance Through Recommendation Using a Domain-Specific Visualization Prevalence Design Space," IEEE Transactions on Visualization and Computer Graphics, TVCG Submission, Jul. 2021, pp. 1-18.

Office Communication for U.S. Appl. No. 16/732,027 dated Feb. 25, 2022, pp. 1-6.

\* cited by examiner

ANALYZING MARKS IN VISUALIZATIONS BASED ON DATASET CHARACTERISTICS

CROSS-REFERENCE TO RELATED APPLICATION

This application is a Utility patent application based on previously filed U.S. Provisional Patent Application No. 62/862,349 filed on Jun. 17, 2019, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively to, automatically explaining the reasons for the appearance of values in a visualization.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data may enable organizations to improve their understanding of critical business operations and help them monitor key performance indicators. However, in some cases, visualizations may include marks, signal, values, or the like, that may seem out of place or otherwise anomalous. In some cases, determining the source or otherwise analyzing these the source or cause of such marks may require an inordinate level of understanding of the underlying data that was used to generate the visualizations. Disadvantageously, this may require organizations to direct skilled or specialized data analysts to review the visualization and data to determine an explanation for why the mark may have a given value. Also, in some cases, even if the user has the skills or technical background to perform their own analysis, the underlying data may be sensitive or otherwise inaccessible to users that may be reviewing the visualizations. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
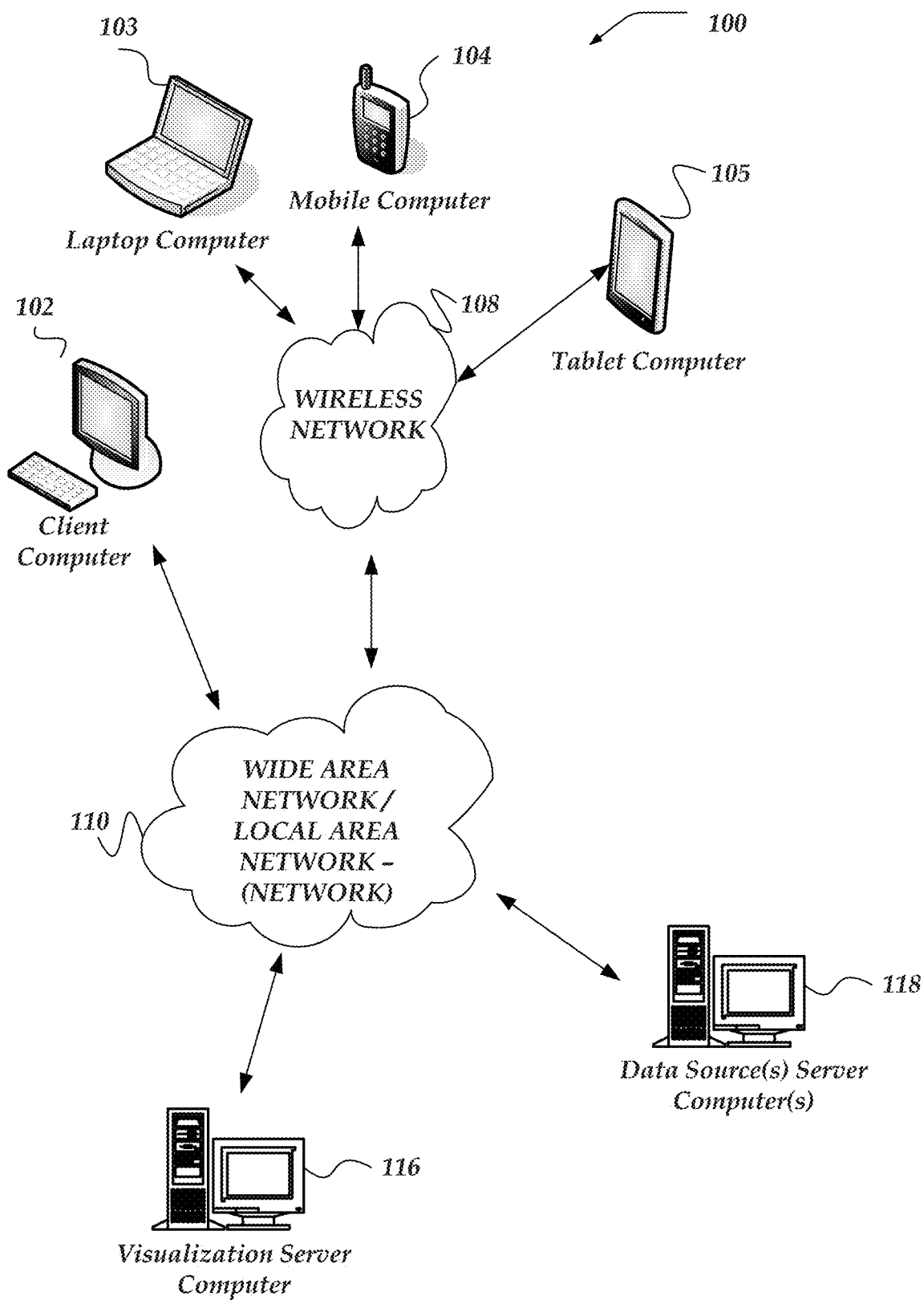
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As user herein the "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "display object" refers to one or more data structures that comprise visualization models. In some cases, display objects may be considered portions of the visualization model. Display objects may represent individual instances of items or entire classes or kinds of items that may be displayed in a visualization. In some embodiments, display objects may be considered or referred to as views because they provide a view of some portion of the data model.

As used herein, the term "mark" refers to a distinct or otherwise identifiable portion of a visualization that may correspond to particular value or result in the visualization. For example, if a visualization includes a bar chart, one or more of the bars may be considered to be marks. Likewise, if a visualization includes a line plot, positions on the plot may be considered a marks.

As used herein, the term "mark-of-interest" refers to a mark in a visualization that has been selected from among the other marks included in the visualization. In some cases, marks in visualizations may incorporate one or more interactive features that may enable a user to select or identify one or more marks-of-interest from among the marks comprising a visualization. For example, a user may be enabled to select a mark-of-interest by right-clicking a mouse button while the mouse pointer may be hovering over a mark. In some cases, marks-of-interest may be selected via searching, filtering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data using one or more processors that execute one or more instructions to perform as described herein.

In one or more of the various embodiments, one or more visualizations based on data from a data source may be provided such that the one or more visualizations include one or more marks that may be associated with one or more values from the data source.

In one or more of the various embodiments, a mark-of-interest may be determined from the one or more marks based on one or more characteristics of the one or more marks, the one or more visualizations, or the like. In one or more of the various embodiments, determining the mark-of-interest may include: automatically analyzing the one or more values associated with the one or more marks; and determining the mark-of-interest based on the automatic analysis.

In one or more of the various embodiments, one or more assessment models may be employed to generate one or more assessment results for the one or more assessment models based on the mark-of-interest and the data from the data source such that each assessment result may be associated with one or more scores that may be based on a best fit to the data from the data source and a value of the mark-of-interest. In one or more of the various embodiments, generating the one or more assessment results may include: generating one or more natural language narratives that describe one or more characteristics of the mark-of-interest based on its assessment and one or more narrative templates; and including the one or more natural language narratives in the one or more assessment results.

In one or more of the various embodiments, the one or more assessment results may be rank ordered based on their association with the one or more scores.

In one or more of the various embodiments, a report that includes the rank ordered list of the one or more assessment results may be provided. In one or more of the various embodiments, providing the report may include generating one or more other visualizations that may be associated with the one or more assessment models, the one or more assessment results, the mark-of-interest, or the like.

In one or more of the various embodiments, feedback information that is associated with the report may be monitored. In one or more of the various embodiments, one or more other scores based on the feedback information may be provided. In one or more of the various embodiments, the one or more other scores may be employed to determine one or more modifications to the one or more assessments results.

In one or more of the various embodiments, the one or more assessment results may be filtered based on the one or more scores such that each assessment result associated with a score that may be less than a defined threshold value is excluded from the report.

In one or more of the various embodiments, data associated with the mark-of-interest that is included in the data source and omitted from the visualization may be evaluated. Accordingly, in some embodiments, a portion of the one or more assessment results may be generated based on the evaluation.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, visualization server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, Hypertext Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, data source server computer 118, or other computers.

Client computers 102-105 may further be configured to include a client application that enables an end-user to log into an end-user account that may be managed by another computer, such as visualization server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, data source server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116, data source server computer 118 are described in more detail below in conjunction with FIG. 3. Although FIG. 1 illustrates visualization server computer 116, data source server computer 118, or the like, each as a single computer, the innovations or embodiments are not so limited. For example, one or more functions of visualization server computer 116, data source server computer 118, or the like, may be distributed across one or more distinct network computers. Moreover, in one or more embodiments, visualization server computer 116, data source server computer 118 may be implemented using a plurality of network computers. Further, in one or more of the various embodiments, visualization server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
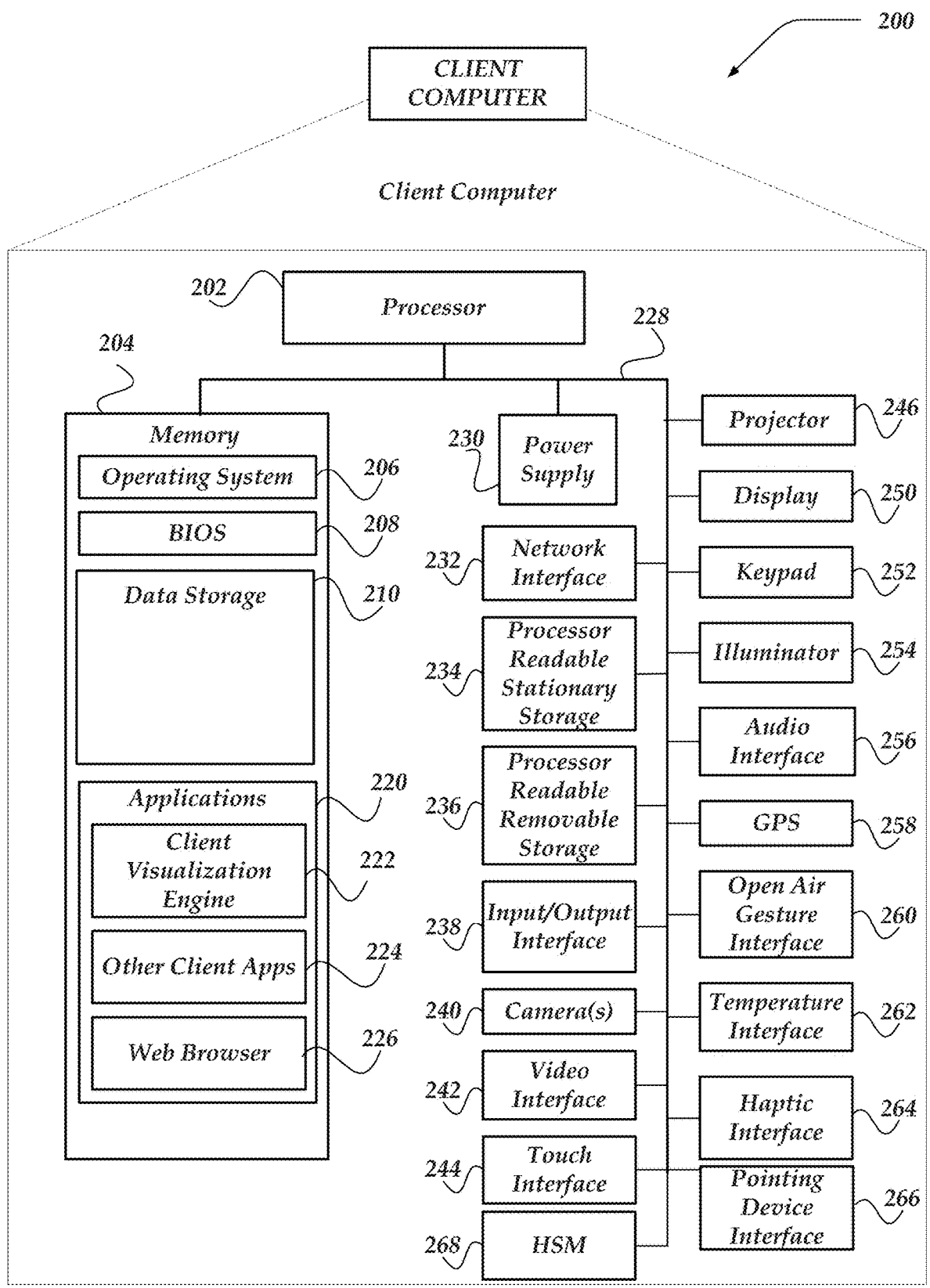
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geo-location information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
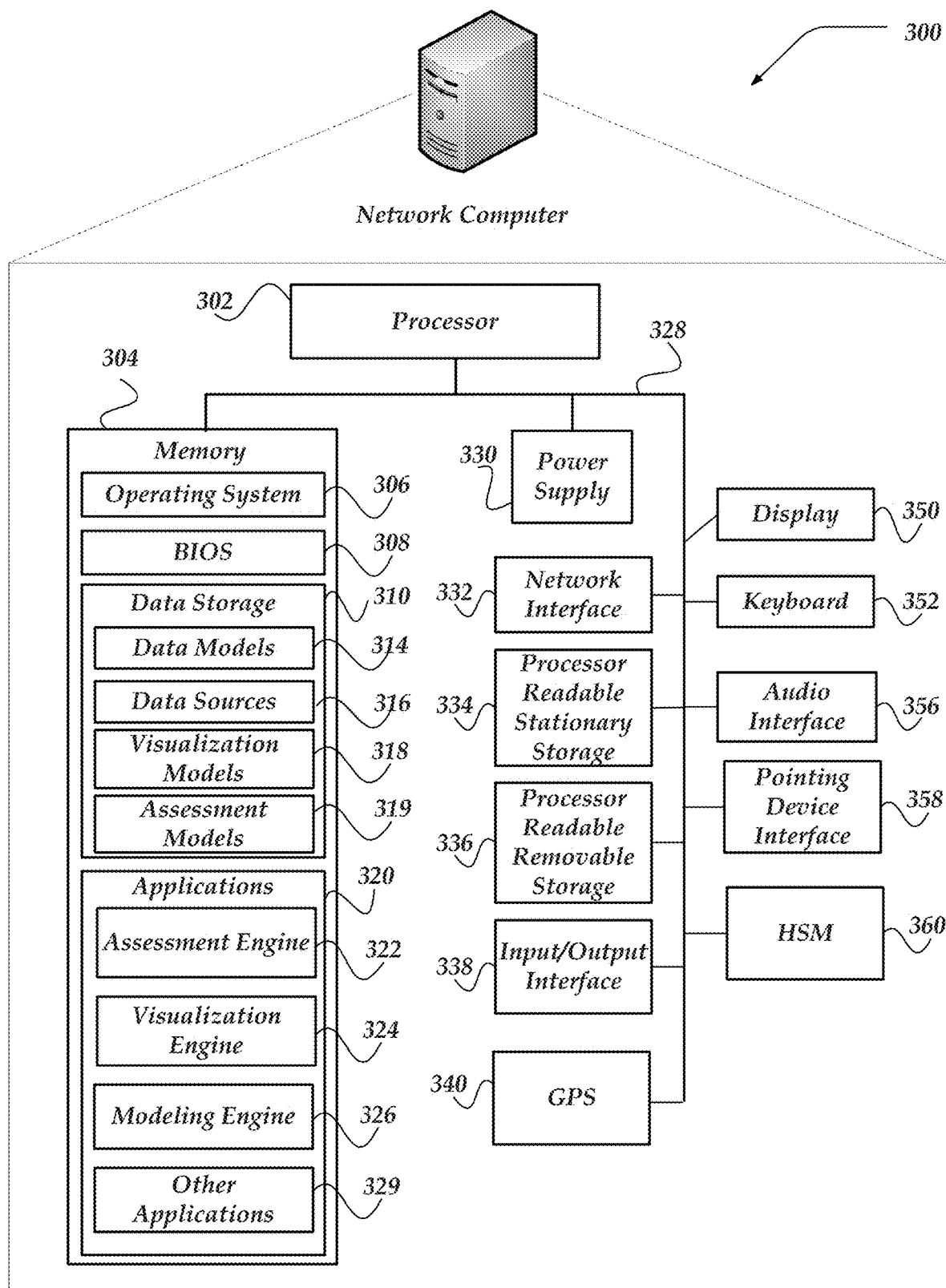
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, assessment engine 322, visualization engine 324, modeling engine 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, data sources 316, visualization models 318, assessment models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include assessment engine 322, visualization engine 324, modeling engine 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, assessment engine 322, visualization engine 324, modeling engine 326, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to assessment engine 322, visualization engine 324, modeling engine 326, other applications 329, or the like, may be provisioned and de-commissioned automatically.

Also, in one or more of the various embodiments, assessment engine 322, visualization engine 324, modeling engine 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
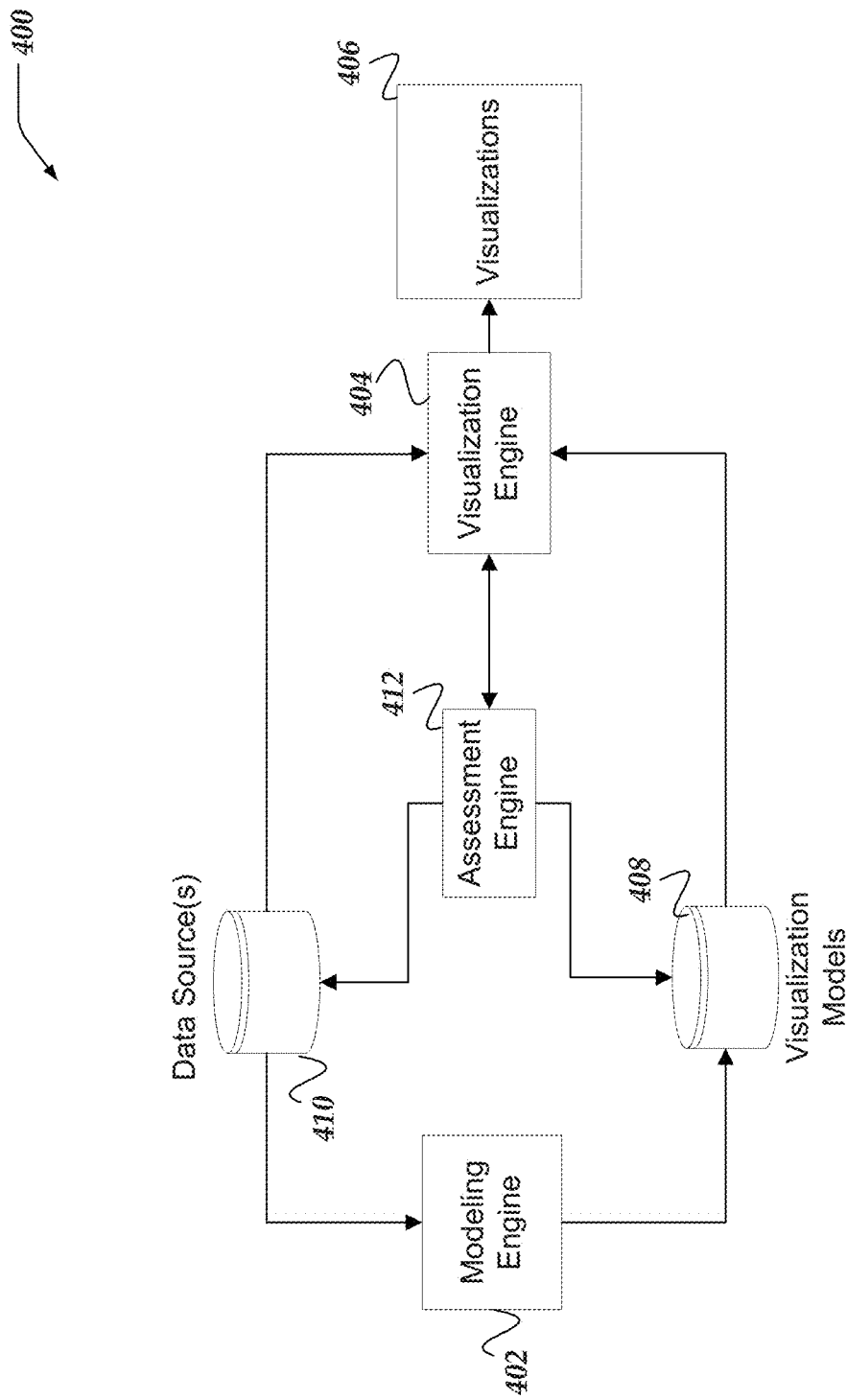
FIG. 4 illustrates a logical architecture of a system for analyzing marks in visualizations based on data characteristics in accordance with one or more of the various embodiments.

FIG. 4 illustrates a logical architecture of system 400 for analyzing marks in visualizations based on data characteristics in accordance with one or more of the various embodiments. In one or more of the various embodiments, system 400 may be comprised of various components, including, one or more modeling engines, such as, modeling engine 402; one or more visualization engines, such as, visualization engine 404; one or more visualizations, such as, visualization 406; one or more data sources, such as, data source 410; one or more visualization models, such as, visualization model 408; or one or more assessment engines, such as, assessment engine 412.

In one or more of the various embodiments, modeling engine 402 may be arranged to enable users to design one or more visualization models that may be provided to visualization engine 404. Accordingly, in one or more of the various embodiments, visualization engine 404 may be arranged to generate one or more visualizations based on the visualization models.

In one or more of the various embodiments, modeling engines may be arranged to access one or more data sources, such as, data source 410. In some embodiments, modeling engines may be arranged to include user interfaces that enable users to browse various data source information, data objects, or the like, to design visualization models that may be used to generate visualizations of the information stored in the data sources.

Accordingly, in some embodiments, visualization models may be designed to provide visualizations that include charts, plots, graphs, tables, graphics, styling, explanatory text, interactive elements, user interface features, or the like. In some embodiments, users may be provided a graphical user interface that enables them to interactively design visualization models such that various elements or display objects in the visualization model may be associated with data from one or more data sources, such as, data source 410.

In one or more of the various embodiments, data sources, such as, data source 410 may include one or more of databases, data stores, file systems, or the like, that may be located locally or remotely. In some embodiments, data sources may be provided by another service over a network. In some embodiments, there may be one or more components (not shown) that filter or otherwise provide management views or administrative access to the data in a data source.

In one or more of the various embodiments, visualization models may be stored in one or more data stores, such as, visualization model storage 408. In this example, for some embodiments, visualization model storage 408 represents one or more databases, file systems, or the like, for storing, securing, or indexing visualization models.

In one or more of the various embodiments, visualization engines, such as, visualization engine 404 may be arranged to parse or otherwise interpret the visualization models and data from data sources to generate one or more visualizations that may be displayed to users.

In one or more of the various embodiments, assessment engines, such as, assessment engine 412 may be arranged to assess or otherwise evaluate marks in a visualization. Accordingly, in some embodiments, assessment engines may be arranged to automatically provide statistical explanations for the value of a specific data point (e.g., mark), even if the data for the explanation has been omitted from the visualization. In some embodiments, assessment engines may be arranged to automatically pull in additional data from the data source associated with a visualization and evaluate its relevancy using statistical models, such as, assessment models. In one or more of the various embodiments, explanations about a mark may be conveyed to users as text strings and interactive visualizations, which be further explored.

In one or more of the various embodiments, assessment engines may enable users to select one or more marks-of-interest from in visualization. Accordingly, in some embodiments, visualization engines may be arranged to generate visualizations that include interactive user interfaces features that enable a user to select a mark-of-interest. For example, in one or more of the various embodiments, visualization engines may be arranged to include an assess-this-mark command in a right-click context menu. Thus, in some embodiments, users may right-click on a display object that represents the mark-of-interest to bring up a context menu and then select the assess-this-mark command from the context menu. In other embodiments, users may be enabled to search for marks-of-interest using names or labels associated with a mark.

Figure 5:
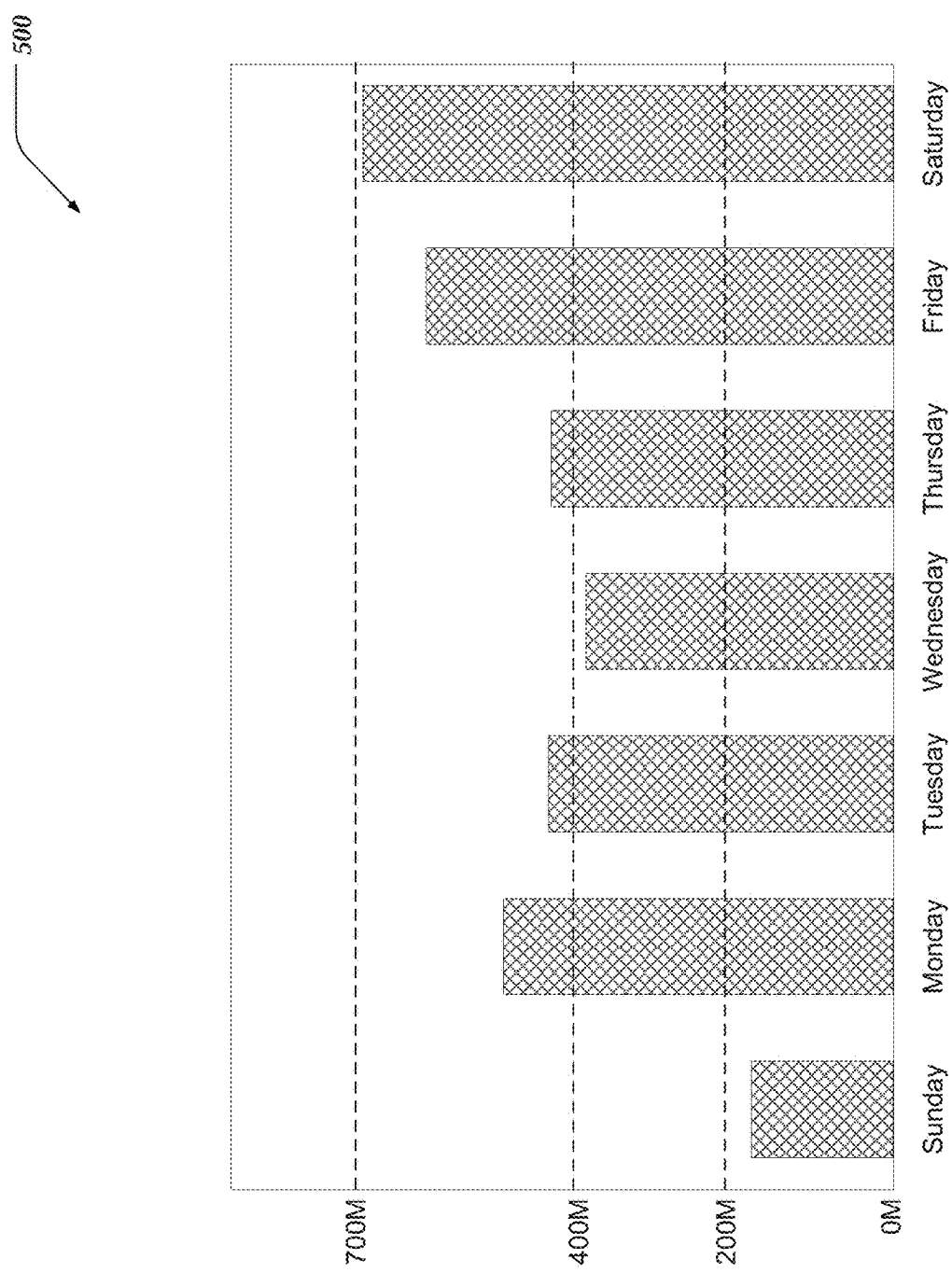
FIG. 5 illustrates a logical representation of a portion of a visualization in accordance with one or more of the various embodiments.

FIG. 5 illustrates a logical representation of a portion of visualization 500 in accordance with one or more of the various embodiments. As described above, visualization engines may be arranged to employ visualization models and data to generate visualizations, such as, visualization 500. In this example, visualization 500 represents a bar chart that shows sales revenue per day-of-week. One of ordinary skill in the art will appreciate that visualization models or visualization engines may be arranged to generate many different types of visualizations for various purposes depending on the design goals of users or organizations. Here, visualization 500 is presented as a non-limiting example to help provide clarity to the description of these innovations. One of ordinary skill in the art will appreciate that this example is at least sufficient to disclose the innovations herein and that visualization engines or visualization models may be arranged to generate many different visualizations for many different purposes in many domains.

In this example, visualization 500 includes mark 502 that represents the revenue earned on Sunday. Accordingly, in this example, mark 502 may appear to be an anomalous result given that it appears to be significantly lower than the other marks in visualization 500.

In this example, mark 502 may be determined to be a mark of interest because it may appear anomalous compared to the other marks that may be associated with the revenue values for the other days-of-the-week. In some embodiments, users may be enabled to identify one or more marks-of-interest that seem interesting or anomalous. Also, in some embodiments, an assessment engine may be arranged to automatically identify one or more marks-of-interest based on automatically identifying marks that may be anomalies or statistical outliers.

In some embodiments, if a mark may be identified as a mark-of-interest, an assessment engine may be arranged to automatically perform one or more actions to analyze the mark-of-interest to provide an explanation for the apparent discrepancies. In some cases, an analysis performed by the assessment engine may determine that the mark-of-interest may be within expectations rather than being an anomaly.

Figure 6:
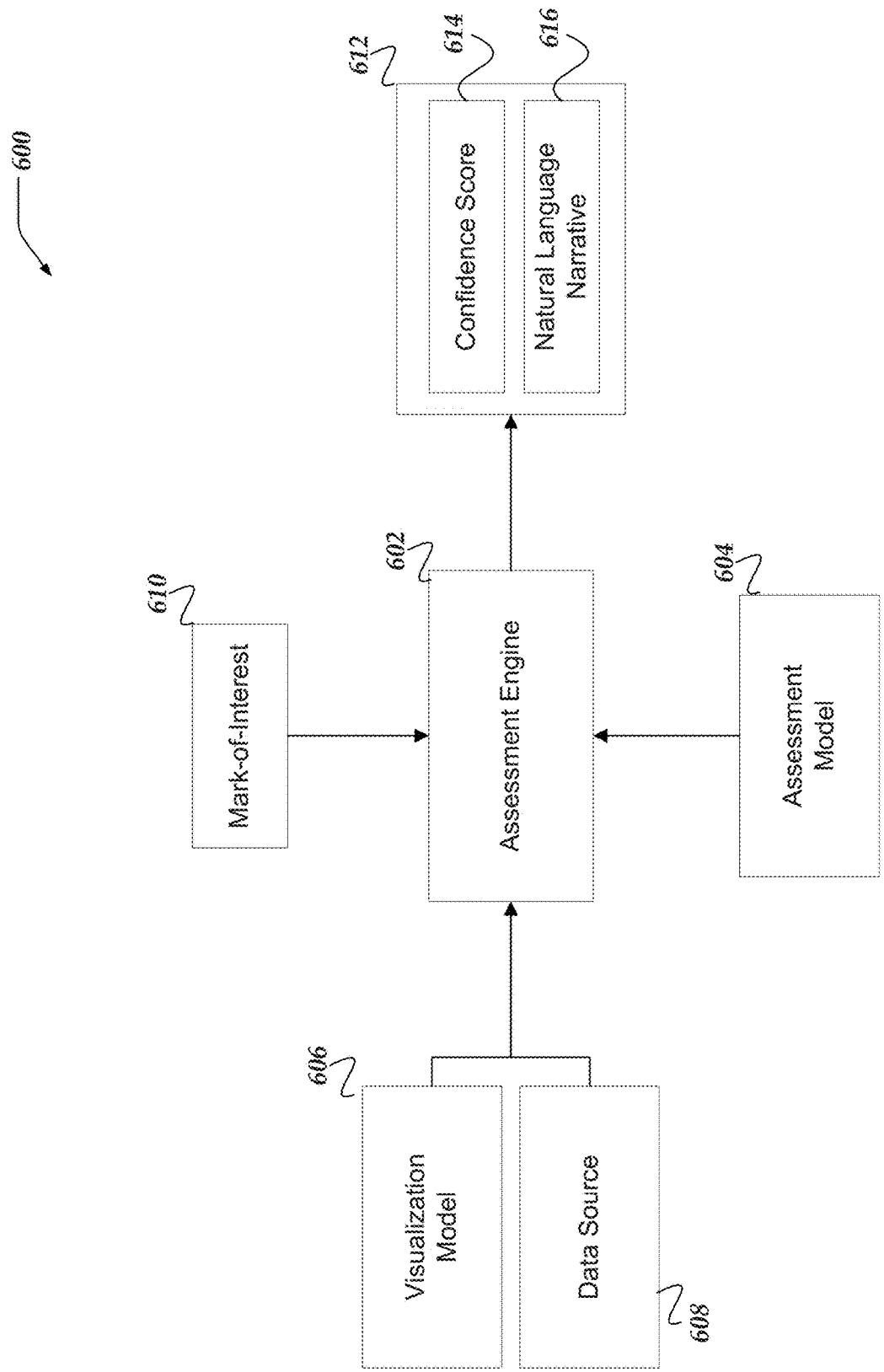
FIG. 6 illustrates a logical representation of a portion of a mark assessment system in accordance with one or more of the various embodiments.

FIG. 6 illustrates a logical representation of a portion of mark assessment system 600 in accordance with one or more of the various embodiments. In one or more of the various embodiments, system 600 may include one or more components, such as, assessment engine 602, assessment model 604, visualization model 606, data source 608, mark-of-interest 610, assessment result 612. In some embodiments, assessment results, such as, assessment result 612 may be arranged to include confidence score 614 or narrative 616.

In one or more of the various embodiments, assessment engine 602 may be arranged to assess mark-of-interest 610 based on assessment model 604. In one or more of the various embodiments, assessment models may be arranged to include one or more heuristics or machine-learning evaluators that may be executed to classify marks-of-interest.

As discussed herein, assessment engines may be arranged to employ one or more assessment models and provide one or more reports regarding how well a given assessment model matches (or classifies) a mark-of-interest. Accordingly, in this example, assessment result 612 includes a score, such as, confidence score 614 and natural language narrative 616.

In one or more of the various embodiments, assessment models may be arranged to provide a score that represents how well they explain the marks-of-interest. In some embodiments, assessment engines may be arranged to execute or apply assessment models to perform various evaluations of the mark-of-interests, visualization models, or data sources to classify the mark-of-interest. In some embodiments, confidence scores that represent how well the mark-of-interest fits the assessment model may be provided by the assessment model. For example, assessment model A may be arranged to execute ten tests or evaluate ten conditions that provide a score that includes ten points for each matched condition. Likewise, in some embodiments, assessment models may execute or apply one classifier that provides a confidence score.

In one or more of the various embodiments, different assessment models may employ different scoring criteria. Accordingly, in some embodiments, assessment engines may be arranged to weight or normalize confidence scores provided by different assessment models. In some embodiments, the particular normalization rules or weight rules for normalizing or weighting assessment model confidence scores may be provided via configuration information.

Also, in one or more of the various embodiments, assessment models may be arranged to provide natural language narratives, such as, narrative 616. In some embodiments, natural language narratives may be employed in user interfaces or reports that may be provided to a user to explain the assessment of the marks-of-interest with respect a given assessment model. In some embodiments, narratives may be based on templates that enable labels, units, values, or the like, that may be associated with mark-of-interest or visualization model to be included in the user interfaces or report information.

In one or more of the various embodiments, assessment models may be designed or tailored to evaluate one or more statistical features of data associated with a mark-of-interest. Accordingly, in one or more of the various embodiments, assessment engines may be arranged to apply one or more assessment models to assess if the data associated with a mark-of-interest have the one or more of the statistical features targeted by an assessment model. In some embodiments, assessment models may be arranged to provide the confidence score as a form of a self-grade that represents how close the data associated with the mark-of-interest matches the statistical features the assessment model may be designed to match or otherwise evaluate.

In one or more of the various embodiments, one or more assessment models may focus on general, well-known, or commonplace statistical features that may be expected to be associated with marks-of-interest.

Also, in one or more of the various embodiments, one or more assessment models may be customized or directed to particular problem domains or business domains. For example, assessment models directed to financial information may be arranged differently than assessment models directed to employee information. Likewise, for example, assessment models directed to the automobile industry may be arranged differently than assessment models directed to the cruise (ship) industry. Further, in one or more of the various embodiments, one or more assessment models may be customized for particular data sources or visualization models for a particular organization or user. Accordingly, in one or more of the various embodiments, assessment models may be stored in data store that enables them to be configured independently from each other.

In one or more of the various embodiments, assessment engines may be arranged to generate or maintain profiles for one or more assessment models. In some embodiments, profiles may be arranged to track information that may be used for adapting assessment model results to particular organizations, users, problem domains, or the like.

Accordingly, in one or more of the various embodiments, assessment engines may be arranged to employ user activity information or user feedback to automatically build assessment model profiles that may be employed to modify or customize assessment reports. For example, if users of an organization consistently report mismatches between the marks-of-interest and assessment results, the assessment engine may be arranged to introduce weighting rules that increase or decrease the effective confidence scores used for ranking assessment results for the organization based on the user feedback information.

In one or more of the various embodiments, if a user selects a mark-of-interest in a visualization, the assessment engine may determine one or more assessment models and apply them to the mark-of-interest and its associated visualization model or data source. Accordingly, non-limiting examples of assessment models are discussed below. For brevity and clarity this discussion is limited to a few examples, however, one of ordinary skill in the art will appreciate that other assessment models that may incorporate other or additional assessment strategies are contemplated.

NUMBER OF ROWS: An assessment model may be arranged to determine if there may be an unusually high or low number of data values or data records rolled up into the value represented by the mark-of-interest as compared to other marks in the visualization. For example, in some cases, if a value for a mark-of-interest seems high compared other marks it might be explained because the number of underlying records contributing the mark-of-interest may be greater that other marks, such as, Chinese GDP being high because there are many people in China.

MEASURE OF ROWS: An assessment model may be enabled to determine if the average value in the rows aggregated to the mark-of-interest is high as compared to other marks in the visualization. For example, in some cases, if a value for a mark-of-interest seems high compared other marks it might be explained because the underlying records contributing the mark-of-interest may have above average values compared to the underlying records for other marks, such as, the US GDP is high because people in the US earn more money than people in other countries UN-VISUALIZED DIMENSION: An assessment model may be arranged to evaluate if the data records rolled up into the mark-of-interest are different from other rows in some dimension that is not included in visualization seen by the users. For example, store X has a high average order value because it sells diamonds, and most other stores do not sell diamonds. And, other stores that sell diamonds also have a high average order values.

VISUALIZED DIMENSION: An assessment model may be arranged to evaluate the if data records rolled up into the mark-of-interest are different from other data records in some dimension that is included in the visualization. For example, store X in 2015 had high total sales, but this is part of the overall trend in sales by store rather than geographic region being relevant to difference between the mark-of-interest and other marks.

ONE OUTLIER: An assessment model may be arranged to determine if there may be a single outlier in the data records associated with the mark-of-interest that may lead to mark-of-interest looking different than other marks in the visualization. Accordingly, in some embodiments, this may suggest that the one data record may be worth investigation further. For example, region X had high sales on 2018 Apr. 28 because outlier order Y occurred on that day.

MULTIPLE OUTLIERS: An assessment model may be arranged to determine if there may be multiple outliers that may collectively cause the mark-of-interest to appear different than other marks in the visualization. This result may suggest a missing latent factor. For example, region X had high sales on 2018 Apr. 28 because orders Y1, Y2, and Y3 were all on that day in that region. Such a result may be worth further investigation.

INTERMEDIATE AGGREGATE: An assessment model may be arranged to determine if a sub-set of data records associated with the mark-of-interest value produce values that may be inconsistent or improbable across the entire set of data records or as compared to other sub-sets of data records. For example, an assessment model may report that region X had high sales on 2018 Apr. 28 because store Y is in region X, and it had high sales that day, but there were no individual orders at store Y that dominate the sales.

Figure 7:
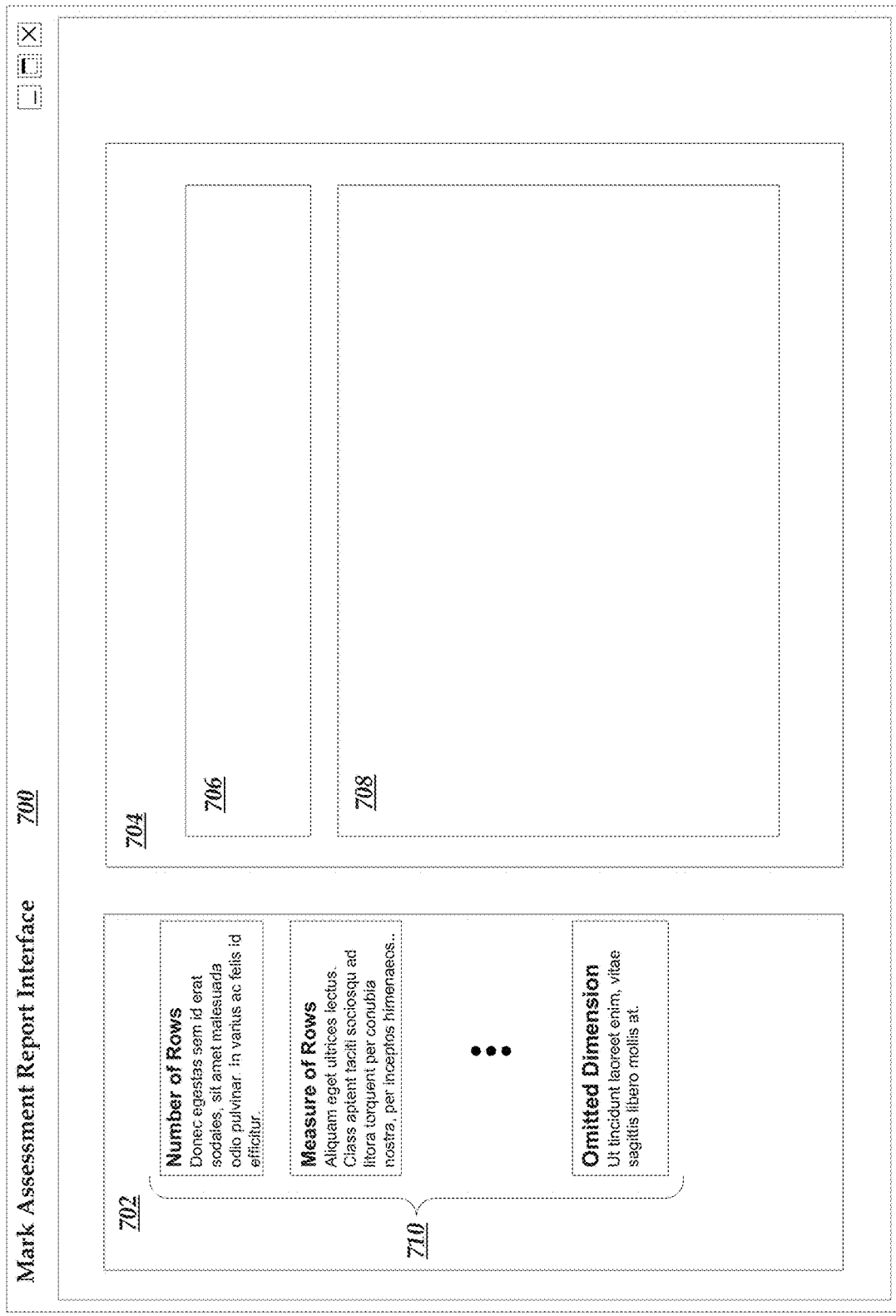
FIG. 7 illustrates a logical representation of a portion of a user interface for analyzing marks in visualizations based on data characteristics in accordance with one or more of the various embodiments.

FIG. 7 illustrates a logical representation of a portion of user interface 700 for analyzing marks in visualizations based on data characteristics in accordance with one or more of the various embodiments. In some embodiments, user interface 700 may be arranged to include one or more panels, such as, panel 702, panel 704, panel 706, panel 708, explanations 710, or the like.

In this example, for one or more of the various embodiments, panel 702 may be arranged to display a rank order list of the explanations for the mark-of-interest that was analyzed by the assessment engine. In some embodiments, each explanation item may include a natural language narrative that may provide a potential explanation of the values associated with the mark-of-interest as determined by the assessment engine. Likewise, in some embodiments, if the assessment engine may be unable to determine a potential explanation, panel 702 may be arranged to display a narrative to that effect.

In one or more of the various embodiments, the text for the explanation narratives may be based on templates such that the field names or labels that may be associated with the mark or the explanation for the mark may be included in the explanation narrative.

In one or more of the various embodiments, panel 704 may be arranged to include additional explanations or visualizations that may be related to the mark that was analyzed by the assessment engine. In some embodiments, panels, such as, panel 706 may include additional explanation narrative related to the mark or the one or more visualizations that may help explain the mark to users. Also, in some embodiments, panels, such as, panel 708 may include visualizations that help explain the mark. For example, panel 708 may include one or more alternate visualizations that help explain the reasons why a mark appeared anomalous.

In one or more of the various embodiments, assessment engines, visualization engines, or the like, may be arranged to use specific visualization models or explanation text/narrative templates for different assessment models. In some embodiments, the visualization models or explanation/narrative templates for an assessment model may be defined in configuration information. Accordingly, the explanations/narrative text or visualizations included in user interface 700 may be tailored for a particular organization, locale, or the like.

In one or more of the various embodiments, assessment engines or visualization engines may be arranged to determine some or all of the content or styling for user interface 700 via configuration information. Accordingly, in some embodiments, the narrative explanation text or templates, panel layout, visualizations, or the like, may be configured differently depending on the needs of the organization, users, or the like.

Generalized Operations

FIGS. 8-12 represent generalized operations for analyzing marks in visualizations based on data characteristics in accordance with one or more of the various embodiments. In one or more of the various embodiments, processes 800, 900, 1000, 1100, and 1200 described in conjunction with FIGS. 8-12 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-12 may be used for analyzing marks in visualizations based on data characteristics in accordance with at least one of the various embodiments or architectures such as those described in conjunction with FIGS. 4-7. Further, in one or more of the various embodiments, some or all of the actions performed by processes 800, 900, 1000, 1100, and 1200 may be executed in part by assessment engine 322, visualization engine 324, modeling engine 326 one or more processors of one or more network computers.

Figure 8:
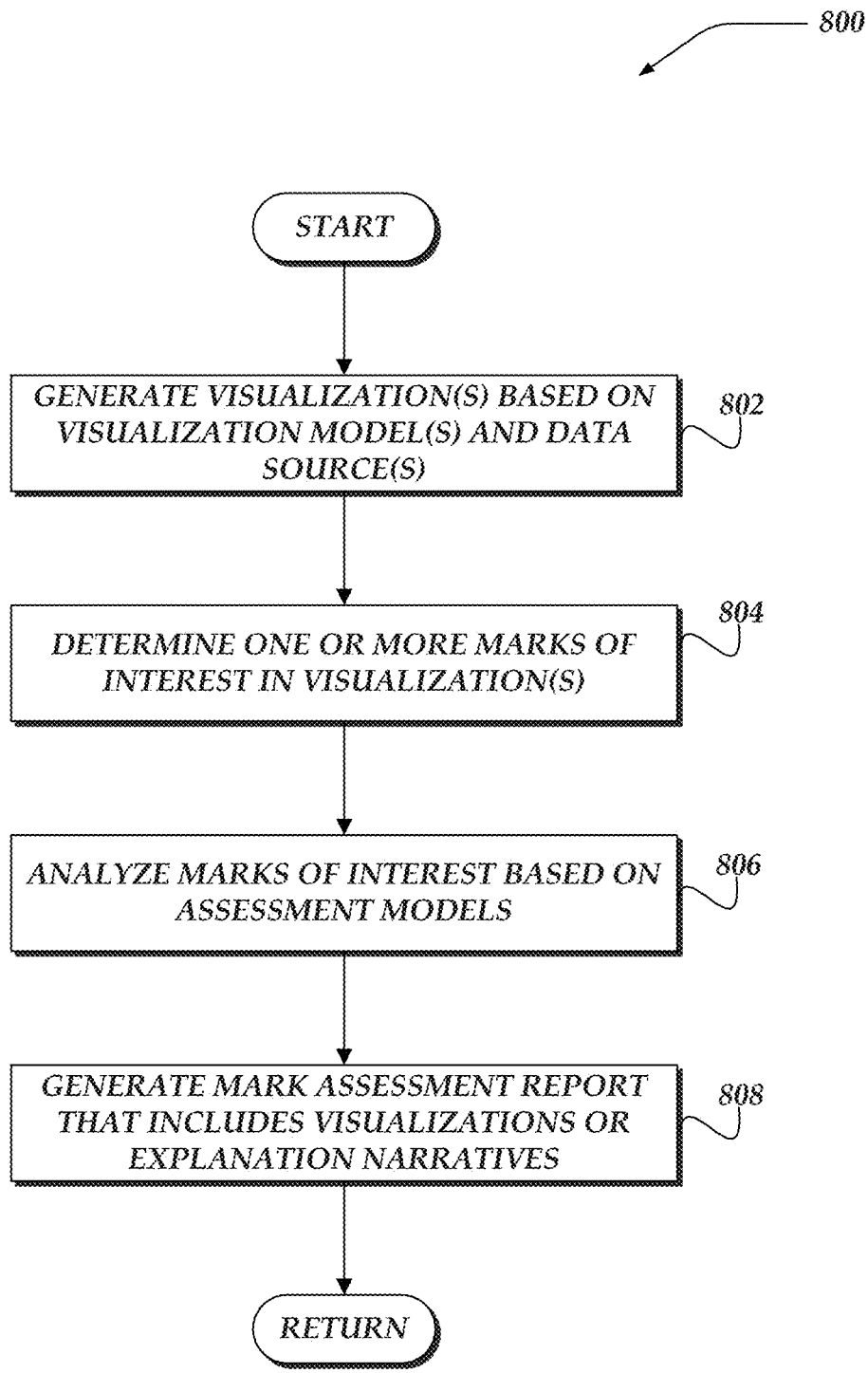
FIG. 8 illustrates an overview flowchart for a process for analyzing marks in visualizations based on data characteristics in accordance with one or more of the various embodiments.

FIG. 8 illustrates an overview flowchart for process 800 for analyzing marks in visualizations based on data characteristics in accordance with one or more of the various embodiments. After a start block, at block 802, in one or more of the various embodiments, a visualization engine may be arranged to generate one or more visualizations based on one or more visualization models or data sources. As described above, a visualization system may be arranged to include, one or more modeling engines, one or more data sources, one or more visualization engines, or the like, that may be arranged to generate visualizations based on one or more visualization models and data provided by the one or more data sources.

At block 804, in one or more of the various embodiments, an assessment engine may be arranged to determine one or more marks of interest in the one or more visualizations. In some embodiments, the marks of interest may be selected by a user.

In one or more of the various embodiments, assessment engines may be arranged to automatically identify one or more marks that may appear inconsistent with other marks in visualization. In some embodiments, assessment engines may be arranged to execute actions to perform one or more heuristic evaluations to determine if one or more marks may be identified as marks-of-interest. In some embodiments, assessment engines may be arranged to highlight or otherwise indicate in the visualization user interface which marks may be marks-of-interest. The particular styling for indicating a potential mark-of-interest may vary depending on the organization, as well as, configuration information.

In some embodiments, marks-of-interest automatically determined by the assessment engine may be considered potential marks-of-interest. Accordingly, in some embodiments, users may be enabled to confirm if a potential mark-of-interest should be assessed by the assessment engine.

At block 806, in one or more of the various embodiments, the assessment engine may be arranged to analyze the one or more marks of interest based one or more assessment models. In one or more of the various embodiments, assessment engines may be arranged to execute one or more assessment models to assess the marks-of-interest to determine explanations that may provide insight into which how the characteristics of underlying data/data-source contributed to the marks-of-interest.

At block 808, in one or more of the various embodiments, the assessment engine may be arranged to generate one or more assessment reports that may include one or more visualizations or one or more explanation narratives associated with the one or more marks. As described above, in some embodiments, assessment reports may include interactive user interfaces that enable users to review the assessment results that may include explanation narratives that may describe one or more characteristics of the marks-of-interest.

Next, in one or more of the various embodiments, control may be returned to a calling process.

Figure 9:
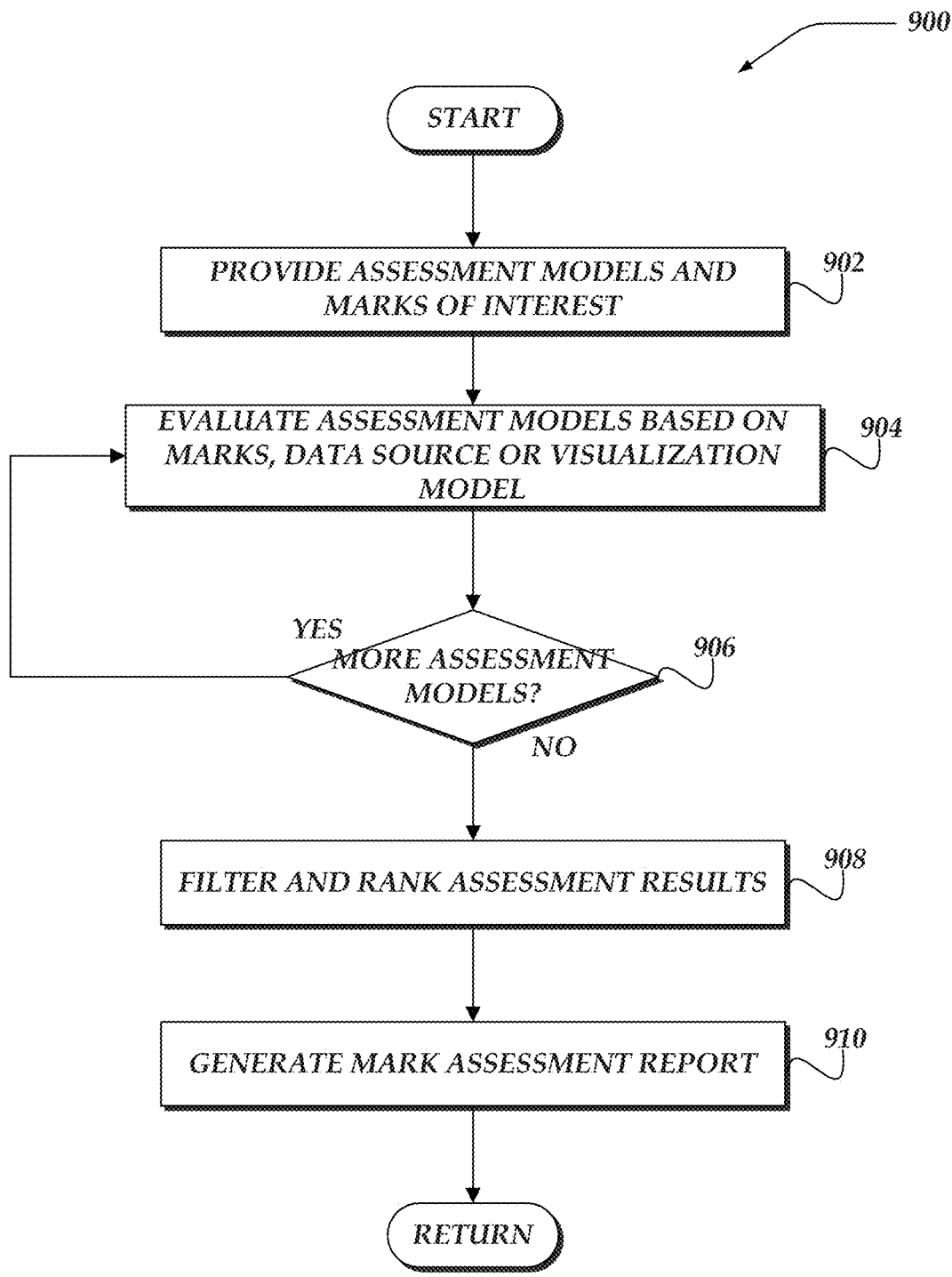
FIG. 9 illustrates a flowchart of a process for analyzing marks using assessment models in accordance with one or more of the various embodiments.

FIG. 9 illustrates a flowchart of process 900 for analyzing marks using assessment models in accordance with one or more of the various embodiments. After a start block, at block 902, in one or more of the various embodiments, an assessment engine may be one or more assessment models and one or more marks of interest. As described above, in some embodiments, one or more assessment models may be defined for assessing marks. Accordingly, in some embodiments, the assessment engine may be arranged to obtain one or more assessment models from a data store, or the like. In some embodiments, assessment engines may be arranged to determine the particular assessment models based on rules, conditions, or the like, that may be provided via configuration information.

At block 904, in one or more of the various embodiments, the assessment engine may be arranged to evaluate the one or more assessment models based on the marks, visualization models, data sources, or the like. In one or more of the various embodiments, assessment models may include or be associated rules, conditions, computer readable instructions, or the like, that an assessment engine may execute or apply to assessment a mark.

At decision block 906, in one or more of the various embodiments, if there may be more assessment models to evaluate, control may loop back to block 904; otherwise, control may flow to block 908. In some embodiments, assessment engines may be arranged to end the assessment early by omitting or skipping one or more assessment models. For example, in some embodiments, assessment engines may be configured stop evaluating additional assessment models if a previously evaluated assessment model may be considered to provide a sufficient explanation for the mark-of-interest.

Accordingly, in one or more of the various embodiments, assessment engines may be arranged to associate a confidence score with assessment results provided by an assessment model. In some embodiments, assessment models may be arranged to provide a confidence score that indicates how well the assessment model matches or explains the mark.

Also, in one or more of the various embodiments, assessment engines may be arranged to maintain another set of confidence scores that may be combined with the confidence score provided by the assessment model. Thus, in some embodiments, the overall confidence score of an assessment of a mark may be a combination of a score provided by the assessment model and a score provided by the assessment engine.

For example, in some embodiments, the confidence score provided by the assessment engine may be generated based on other factors or metrics that may be unavailable or irrelevant to an assessment model. In some embodiments, such factors or metrics may be based on user feedback, organization requirements (e.g., configuration information), metrics associated with organization or community activity, or the like.

At block 908, in one or more of the various embodiments, the assessment engine may be arranged to filter and rank the results provided by the assessment models. In one or more of the various embodiments, assessment models may be arranged to provide one or more confidence scores that represents a self-assessment of how well an explanation provided by the model matches the mark.

Also, in one or more of the various embodiments, assessment engines may be arranged to modify confidence scores provided by assessment models to provide a final confidence score.

Accordingly, in one or more of the various embodiments, assessment engines may be arranged to eliminate one or more explanations based on filtering out one or more assessment models based on rules, conditions, or the like. For example, in some embodiments, an assessment engine may be configured automatically exclude explanations that are associated with confidence scores that fall below a defined threshold value.

Also, in one or more of the various embodiments, other metrics or features of one or more of the explanations, visualization models, data sources, data, users, organizations, or the like, may be incorporated into conditions, rules, or the like, that may be executed to filter out one or more assessments or explanations. For example, in some embodiments, filters may include conditions associated with one or more user roles. Accordingly, for example, a filter may be configured to be more inclusive for some user roles or less inclusive for other user roles. Thus, in this example, the number of explanations included in an assessment report may be increased for data scientists or reduced for regular users.

In some embodiments, other metrics or features used for filtering may be based on various sources, including, organization preferences, user preferences, localization, user input, other configuration information, or the like.

Similarly, in one or more of the various embodiments, assessment engines may be arranged to rank order the one or more explanations based on various conditions, rules, metrics, or features. For example, in some embodiments, explanations may be rank ordered based on confidence scores, or the like. Further, for example, in some embodiments, one or more explanations may be rank ordered based on user preferences, organization preferences, or the like.

Similar to filters, in some embodiments, the various conditions, rules, metrics, or features used for rank ordering explanations may be based on various sources, including, organization preferences, user preferences, localization, user input, other configuration information, or the like.

At block 910, in one or more of the various embodiments, the assessment engine may be arranged to generate an assessment report. In one or more of the various embodiments, assessment reports may include a variety of information, including the rank ordered list of explanations, descriptions of one or more characteristics of the mark-of-interest that was assessed, visualizations that show the mark-of-interest in different contexts or views, or the like.

Next, in one or more of the various embodiments, control may be returned to a calling process.

Figure 10:
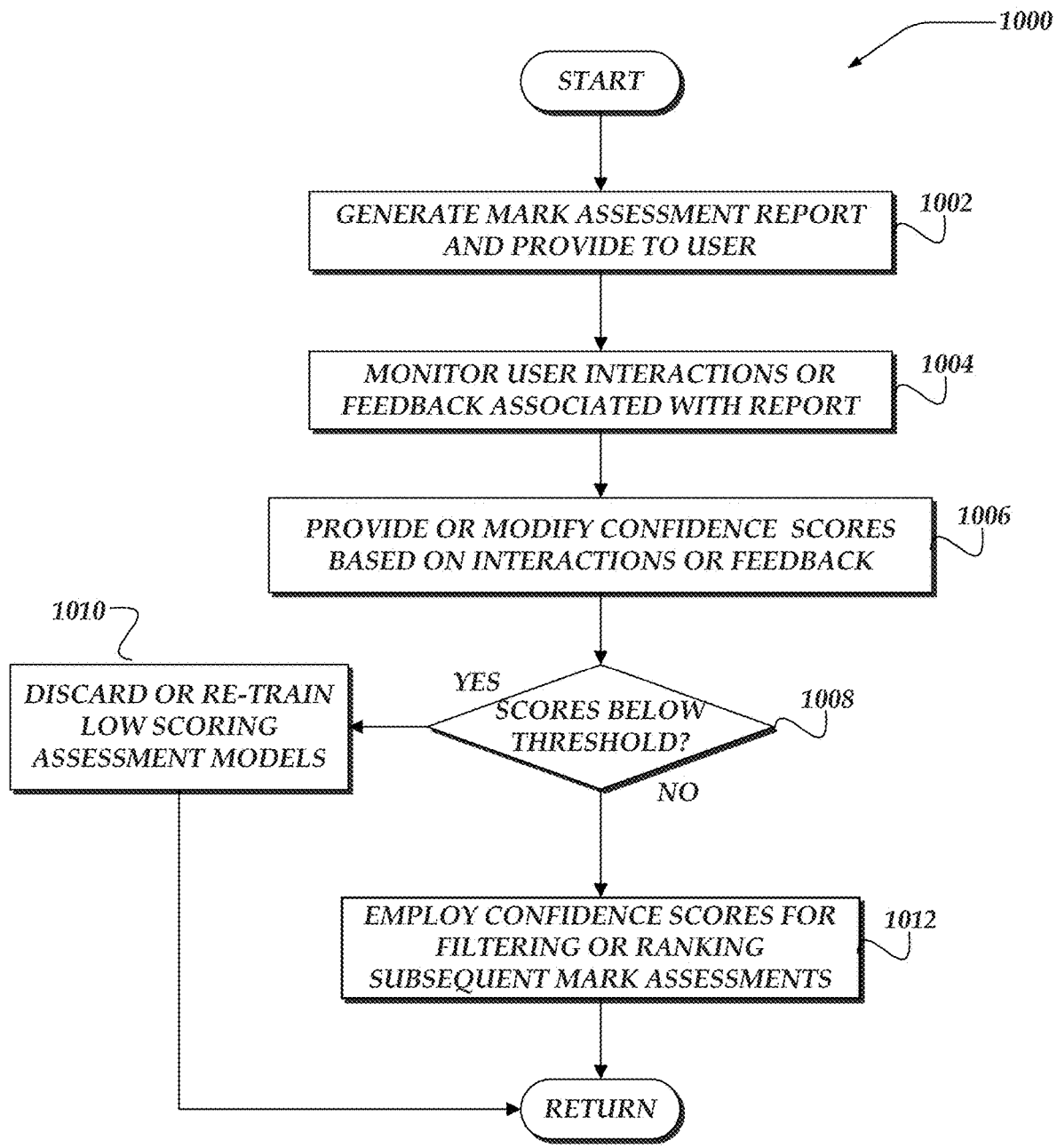
FIG. 10 illustrates a flowchart of a process for adapting filtering or ranking of assessment models based on monitoring user interactions in accordance with one or more of the various embodiments.

FIG. 10 illustrates a flowchart of process 1000 for adapting filtering or ranking of assessment models based on monitoring user interactions in accordance with one or more of the various embodiments. After a start block, at block 1002, in one or more of the various embodiments, an assessment engine may be arranged to generate an assessment report based on an automatic evaluation of one or more marks or interest. As described above, assessment engines may be arranged to provide information for generating interactive reports that include one or more user interface features that enable users to interact with the explanations.

Also, in one or more of the various embodiments, interactive assessment reports may include one or more user interface components that may enable users to provide feedback information to grade the explanations. For example, in some embodiments, an interactive assessment report may enable users to evaluate the explanations or visualizations using various grading systems, such as, helpful/not-helpful, rating scales, (e.g., 1-100, stars, letter grades, or the like), natural language narratives, or the like.

At block 1004, in one or more of the various embodiments, the assessment engine may be arranged to monitor one or more user interactions or user feedback that may be associated with the assessment report. As mentioned above, interactive assessment reports may be arranged to include components or features for directly collecting user feedback. For example, in some embodiments, users may be enabled to grade the usefulness or correctness of one or more explanations. Accordingly, in one or more of the various embodiments, assessment engines may monitor or record the feedback associated with various portions of assessment reports. In some embodiments, assessment engines may be arranged to enabled users to provide an overall grade for entire assessment reports.

Also, in one or more of the various embodiments, assessment engines may be arranged to passively monitor how one or more users interact with assessment reports. In some embodiments, monitoring various user interaction metrics may provide additional insights into the performance or quality of the assessment that may be provided by various assessment models. For example, in some embodiments, if the monitored interactions shows that users are doing things like dismissing one or more explanations, re-sorting the explanation lists, spending a lot of time reviewing lower ranked explanations, clicking on help screens, running several mark assessments over short period, or the like, it may indicate that the explanation narratives or the assessment models may not be explaining marks satisfactorily. In contrast, for example, monitored information that shows that users are accepting the explanations without performing additional confirmation actions or reviews, it may indicate that the assessment reports may be satisfactory.

At block 1006, in one or more of the various embodiments, the assessment engine may be arranged to provide of modify confidence scores based on the monitored interactions or feedback. In one or more of the various embodiments, assessment engines may be arranged to execute one or more formulas to generate a confidence scores that indicate how well assessment models may be performing.

Accordingly, in one or more of the various embodiments, assessment engines may be arranged to increase or decrease assessment model confidence scores based on user feedback or observed user activity. In some embodiments, the impact of various types of feedback or observed activity may vary depending on the type of feedback or observed activity.

In one or more of the various embodiments, assessment engines may be arranged to provide or modify confidence scores based on one or more rules or actions that may be defined in configuration information.

At decision block 1008, in one or more of the various embodiments, if the confidence scores for one or more assessment models fall below a defined threshold, control may flow block 1010; otherwise, control may flow to block 1012.

At block 1010, in one or more of the various embodiments, the assessment engine may be arranged to discard or re-train one or more low scoring assessment models. In some embodiments, assessment engines may be arranged to exclude one or more low scoring assessment models from use for particular organizations. Also, in some embodiments, assessment engines may be arranged to globally exclude one or more assessment models from use by some or all other organizations based on confidence scores that may be associated with one or more assessment models.

In one or more of the various embodiments, rather than discarding poor scoring assessment models, assessment engines may be arranged to indicate that one or more poor scoring assessment models may require re-training or re-certification before they may be employed for assessing marks. Accordingly, in some embodiments, assessment engines may be arranged to generate notifications or include re-training or re-certification information in assessment reports.

At block 1012, in one or more of the various embodiments, the assessment engine may be arranged to employ the confidence scores for filtering or ranking subsequently generated mark assessments or explanations. In one or more of the various embodiments, assessment engines may be arranged to enable organizations or users to define threshold values for including or excluding assessment models or assessment model results from assessment reports. Next, in one or more of the various embodiments, control may be returned to a calling process.

Figure 11:
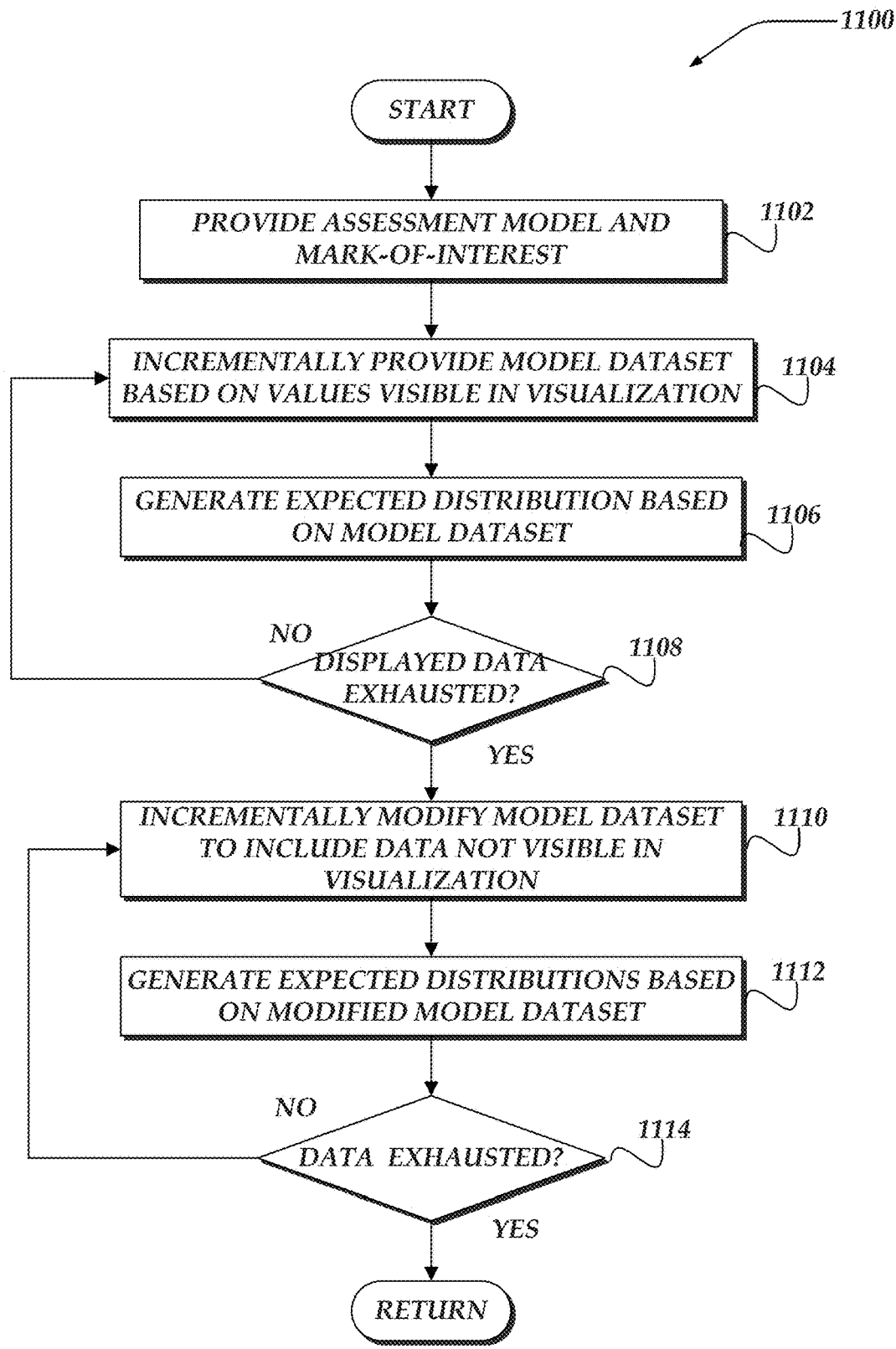
FIG. 11 illustrates a flowchart of a process for generating expected value distributions to for assessment models in accordance with one or more of the various embodiments.

FIG. 11 illustrates a flowchart of process 1100 for generating expected value distributions to for assessment models in accordance with one or more of the various embodiments. After a start block, at block 1102, in one or more of the various embodiments, an assessment engine may be provided an assessment model and a mark-of-interest. As described above, assessment engines may be arranged to evaluate an ensemble of two or more assessment models to determine which one may explain the appearance of the mark-of-interest. Accordingly, in some embodiments, assessment engines may be arranged to evaluate each assessment model in the ensemble of models to rank them based on how well the mark-of-interest may be explained.

At block 1104, in one or more of the various embodiments, the assessment engine may be incrementally provided some or all of the data that may be directly displayed in the visualization. In some embodiments, the visualization that may be displayed to the user may be comprised of one or more portions of the data source. For example, in some embodiments, a visualization may have been generated based on a portion of the columns or fields that may be available in a data source. Accordingly, in some embodiments, columns or fields that may be directly included in the visualization may be determined.

In one or more of the various embodiments, assessment engines may be arranged to incrementally add data included in the visualization to an evaluation data set. For example, in some embodiments, if the displayed visualization may be based on five columns from the data source, assessment engines may be arranged to evaluate assessment models based on two of the visualized columns, then three of the visualized columns, and so on.

In some embodiments, the assessment engine may be arranged to provide the data portions (e.g., columns or fields) in various sequences, such as, the order they appear in the visualization, the order they appear in the data source, random order, one or more sorted orders, or the like. Accordingly, in some embodiments, assessment engines may be arranged to determine the order data portions may be added to a data set based on rules, or the like, included in configuration information.

At block 1106, in one or more of the various embodiments, the assessment engine may be arranged to employ the one or more assessment models and the current data set to provide probability distributions for the mark-of-interest. Accordingly, in some embodiments, assessment models may employ data fields or columns in the current data set to attempt to predict a value for the mark-of-interest based on the current data set.

Accordingly, in one or more of the various embodiments, models may be employed to generate probability distributions that may predict a value for the mark-of-interest each time additional data may be added to the evaluation data set.

At decision block 1108, in one or more of the various embodiments, if the displayed data may be arranged to exhausted, control may flow to block 1110; otherwise, control may loop back block 1104. For example, if the visualization associated with the mark-of-interest included five columns, after each of the assessment models in the ensemble have generated predicted value distributions for the mark-of-interest for each combination of data portions associated with the visualization. Note, assessment engines may be arranged to employ configuration information to determine the number, order, or type of combinations of the data portions used to predict mark-of-interest values. Also, in some embodiments, while most examples described herein involve assessment models that produce probability distributions other types of models or predictors are anticipated, including models that produce a single value and an error range. Also, in one or more of the various embodiments, generally it is anticipated that assessment engines may be arranged to employ various predictive models as long as they may predict a value for the mark-of-interest given a data set selected from the data source.

At block 1110, in one or more of the various embodiments, the assessment engines may be arranged to incrementally modify the model data set to data not included in the visualization. In some embodiments, data sources may include additional data (e.g., columns or fields) that were not included in the visualization. In some cases, the information in other columns or fields may explain the appearance of the mark in the visualization. Accordingly, similar to as described for block 1104, these data portions may be incrementally added to the assessment data set.

At block 1112, in one or more of the various embodiments, the assessment engine may be arranged to employ the assessment models to generate one or more probability distributions based on the incrementally modified data set. Accordingly, similar to as described for block 1106, assessment engines may be arranged to employ the assessment data set and assessment models to predict values for the mark-of-interest.

At decision block 1114, in one or more of the various embodiments, if the remainder of the data portions associated with the mark-of-interest have been exhausted, control may be returned to a calling process; otherwise, control may loop back to block 1110. See, the description for decision block 1108 for additional details.

Figure 12:
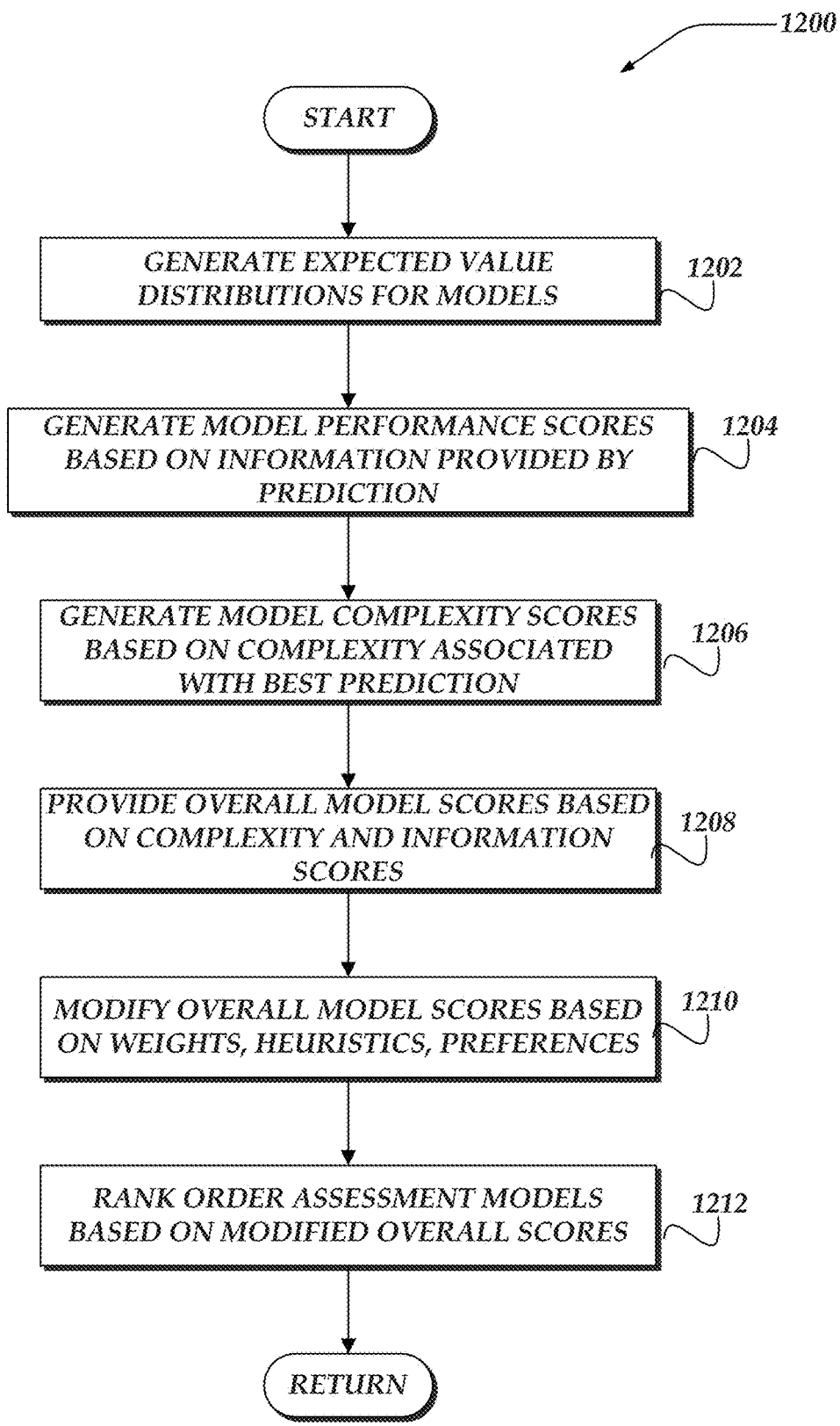
FIG. 12 illustrates a flowchart of a process for comparing the results of assessment models in accordance with one or more of the various embodiments.

FIG. 12 illustrates a flowchart of process 1200 for comparing the results of assessment models in accordance with one or more of the various embodiments. After a start block, at block 1202, in one or more of the various embodiments, assessment engines may be arranged to generate various expected value distributions as described above.

At block 1204, in one or more of the various embodiments, the assessment engines may be arranged to generate model performance scores based on the amount of information provided by a given models best predictions. In some embodiments, the amount information provided by different models may be compared by computing the inherent randomness (e.g., entropy) of the probability distributions produced by a given model. Accordingly, in one or more of the various embodiments, assessment engines may be arranged to employ entropy to compare disparate models. In some embodiments, the particular mechanism for computing entropy for a given model and its results may vary depending on the model types. However, one of ordinary skill in the art may be expected to appreciate the assessment engines may be arranged to execute one or more conventional or well-known information theory computations to estimate to produce an entropy measurement for a given probability distribution. In some embodiments, assessment engines may be arranged to employ one or more rules, instructions, or the like, defined in configuration information to determine entropy values for a given probability distribution or assessment model. Accordingly, in some embodiments, assessment engines may be arranged to employ one or more unconventional or custom methods for computing entropy.

In some embodiments, the amount of information provided by an assessment model prediction may be represented or measured using conventional or well-known information theory units, such as, bits, nats, dits, or the like, that may enable the amount information included in a prediction to be expressed. Accordingly, in some embodiments, the amount of information provided by a different models or distributions may be compared.

At block 1206, in one or more of the various embodiments, the assessment engines may be arranged to generate model complexity scores for each assessment model based on the complexity associated with the provided predictions. Information theory provides various mechanisms for measuring complexity of predictive models that may be employed to fairly compare assessment models. In some embodiments, the complexity may be considered a measurement of how difficult it is for a model to produce a given result. Accordingly, in some embodiments, complexity may be measured based on a variety of factors including, the number of inputs, number of parameters, or the like.

Also, in one or more of the various embodiments, a complexity score may reflect how complex the proposed explanation for the mark-of-interest. For example, in some embodiments, a proposal that suggests a mark-of-interest depends strongly on one other data portion (e.g., column) may be considered less complex than a proposal that depends on two or more other data portions.

In one or more of the various embodiments, assessment engines may be arranged to employ rules, instructions, or the like that may be provided by configuration information to compute a measure of complexity for assessment models. Generally, in some embodiments, these may include well-known or convention information theoretic methods as well as custom or proprietary methods.

At block 1208, in one or more of the various embodiments, the assessment engines may be arranged to provide an overall model score for each assessment model based on associated information scores and complexity scores. In one or more of the various embodiments, the overall score may be arranged to select the assessment model that provided the most information with the least complexity. For example, in some embodiments, information scores (see, block 1204) and complexity scores (see, block 1206) may be normalized or mapped to a 0-100 scale and summed to provide an overall score for an assessment model. However, in some embodiments, assessment engines may be arranged to employ rules, instructions, or the like, provided via configuration information to compute overall scores based on information scores or complexity scores.

At block 1210, in one or more of the various embodiments, assessment engines may be arranged to modify one or more overall model scores based on one or more defined weights, heuristics, user preferences, or the like. For example, as described above, user feedback may be employed to weight the overall score of one or more assessment models. Likewise, in one or more of the various embodiments, one or more assessment models may be observed to produce erroneous results in some conditions, over fitting in scarce data applications, or the like. In one or more of the various embodiments, assessment engines may be arranged to modify overall score for certain assessment models in particular circumstances. Accordingly, in one or more of the various embodiments, assessment engines may be arranged to employ one or more rules, instructions, or the like, provided via configuration information to determine if overall model scores should be modified.

At block 1212, in one or more of the various embodiments, the assessment engines may be arranged to rank order the assessment models based on the modified overall scores.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing visualizations of data using one or more processors that execute instructions to perform actions, comprising:
   providing one or more visualizations based on data from a data source, wherein the one or more visualizations include one or more marks that are associated with one or more values from the data source;
   determining a mark-of-interest from the one or more marks based on one or more characteristics of the one or more marks and the one or more visualizations;
   generating an overall model score for each of one or more assessment models based on a model performance score and a model complexity score, wherein the overall model score is modified based on one or more of a weight, heuristic or a preference, wherein the modified overall model score is employed to provide a rank ordering of the one or more assessment models;
   employing the rank ordering of the one or more assessment models to generate one or more assessment results for the one or more assessment models based on the mark-of-interest and the data from the data source, wherein each assessment result is associated with one or more scores that are based on a fit to the data from the data source and a predicted value of the mark-of-interest;
   rank ordering the one or more assessment results based on their association with the one or more scores; and
   providing a report that includes the rank ordered list of the one or more assessment results.

2. The method of claim 1, wherein generating the one or more assessment results, further comprises:
   generating one or more natural language narratives that describe one or more characteristics of the mark-of-interest based on its assessment and one or more narrative templates; and
   including the one or more natural language narratives in the one or more assessment results.

3. The method of claim 1, wherein providing the report, further comprises, generating one or more other visualizations that are associated with one or more of the one or more assessment models, the one or more assessment results, or the mark-of-interest.

4. The method of claim 1, further comprising:
   monitoring feedback information that is associated with the report;
   providing one or more other scores based on the feedback information; and
   employing the one or more other scores to determine one or more modifications to the one or more assessments results.

5. The method of claim 1, further comprising, filtering the one or more assessment results based on the one or more scores, wherein each assessment result associated with a score that is less than a defined threshold value is excluded from the report.

6. The method of claim 1, wherein determining the mark-of-interest further comprises:
   automatically analyzing the one or more values associated with the one or more marks; and
   determining the mark-of-interest based on the automatic analysis.

7. The method of claim 1, further comprising:
   evaluating data associated with the mark-of-interest that is included in the data source and omitted from the visualization; and
   generating a portion of the one or more assessment results based on the evaluation.

8. A processor readable non-transitory storage media that includes instructions for managing visualizations, wherein execution of the instructions by one or more processors, performs actions, comprising:
   providing one or more visualizations based on data from a data source, wherein the one or more visualizations include one or more marks that are associated with one or more values from the data source;
   determining a mark-of-interest from the one or more marks based on one or more characteristics of the one or more marks and the one or more visualizations;
   generating an overall model score for each of one or more assessment models based on a model performance score and a model complexity score, wherein the overall model score is modified based on one or more of a weight, heuristic or a preference, wherein the modified overall model score is employed to provide a rank ordering of the one or more assessment models;
   employing the rank ordering of the one or more assessment models to generate one or more assessment results for the one or more assessment models based on the mark-of-interest and the data from the data source, wherein each assessment result is associated with one or more scores that are based on a fit to the data from the data source and a predicted value of the mark-of-interest;
rank ordering the one or more assessment results based on their association with the one or more scores; and
providing a report that includes the rank ordered list of the one or more assessment results.

9. The media of claim 8, wherein generating the one or more assessment results, further comprises:
generating one or more natural language narratives that describe one or more characteristics of the mark-of-interest based on its assessment and one or more narrative templates; and
including the one or more natural language narratives in the one or more assessment results.

10. The media of claim 8, wherein providing the report, further comprises, generating one or more other visualizations that are associated with one or more of the one or more assessment models, the one or more assessment results, or the mark-of-interest.

11. The media of claim 8, further comprising:
monitoring feedback information that is associated with the report;
providing one or more other scores based on the feedback information; and
employing the one or more other scores to determine one or more modifications to the one or more assessments results.

12. The media of claim 8, further comprising, filtering the one or more assessment results based on the one or more scores, wherein each assessment result associated with a score that is less than a defined threshold value is excluded from the report.

13. The media of claim 8, wherein determining the mark-of-interest further comprises:
automatically analyzing the one or more values associated with the one or more marks; and
determining the mark-of-interest based on the automatic analysis.

14. The media of claim 8, further comprising:
evaluating data associated with the mark-of-interest that is included in the data source and omitted from the visualization; and
generating a portion of the one or more assessment results based on the evaluation.

15. A system for managing visualizations:
a network computer, comprising:
a transceiver that communicates over the network;
a memory that stores at least instructions; and
one or more processors that execute instructions that perform actions, including:
providing one or more visualizations based on data from a data source, wherein the one or more visualizations include one or more marks that are associated with one or more values from the data source;
determining a mark-of-interest from the one or more marks based on one or more characteristics of the one or more marks and the one or more visualizations;
generating an overall model score for each of one or more assessment models based on a model performance score and a model complexity score, wherein the overall model score is modified based on one or more of a weight, heuristic or a preference, wherein the modified overall model score is employed to provide a rank ordering of the one or more assessment models;
employing the rank ordering of the one or more assessment models to generate one or more assessment results for the one or more assessment models based on the mark-of-interest and the data from the data source, wherein each assessment result is associated with one or more scores that are based on a fit to the data from the data source and a predicted value of the mark-of-interest;
rank ordering the one or more assessment results based on their association with the one or more scores; and
providing a report that includes the rank ordered list of the one or more assessment results; and
a client computer, comprising:
a transceiver that communicates over the network;
a memory that stores at least instructions; and
one or more processors that execute instructions that perform actions, including:
receiving the report.

16. The system of claim 15, wherein generating the one or more assessment results, further comprises:
generating one or more natural language narratives that describe one or more characteristics of the mark-of-interest based on its assessment and one or more narrative templates; and
including the one or more natural language narratives in the one or more assessment results.

17. The system of claim 15, wherein providing the report, further comprises, generating one or more other visualizations that are associated with one or more of the one or more assessment models, the one or more assessment results, or the mark-of-interest.

18. The system of claim 15, wherein the one or more processors of the network computer execute instructions that perform actions, further comprising:
monitoring feedback information that is associated with the report;
providing one or more other scores based on the feedback information; and
employing the one or more other scores to determine one or more modifications to the one or more assessments results.

19. The system of claim 15, wherein the one or more processors of the network computer execute instructions that perform actions, further comprising, filtering the one or more assessment results based on the one or more scores, wherein each assessment result associated with a score that is less than a defined threshold value is excluded from the report.

20. The system of claim 15, wherein determining the mark-of-interest further comprises:
automatically analyzing the one or more values associated with the one or more marks; and
determining the mark-of-interest based on the automatic analysis.

21. The system of claim 15, wherein the one or more processors of the network computer execute instructions that perform actions, further comprising:
evaluating data associated with the mark-of-interest that is included in the data source and omitted from the visualization; and
generating a portion of the one or more assessment results based on the evaluation.

22. A network computer for managing user visualizations, comprising:
- a transceiver that communicates over the network;
- a memory that stores at least instructions; and
- one or more processors that execute instructions that perform actions, including:
  - providing one or more visualizations based on data from a data source, wherein the one or more visualizations include one or more marks that are associated with one or more values from the data source;
  - determining a mark-of-interest from the one or more marks based on one or more characteristics of the one or more marks and the one or more visualizations;
  - generating an overall model score for each of one or more assessment models based on a model performance score and a model complexity score, wherein the overall model score is modified based on one or more of a weight, heuristic or a preference, wherein the modified overall model score is employed to provide a rank ordering of the one or more assessment models;
  - employing the rank ordering of the one or more assessment models to generate one or more assessment results for the one or more assessment models based on the mark-of-interest and the data from the data source, wherein each assessment result is associated with one or more scores that are based on a fit to the data from the data source and a predicted value of the mark-of-interest;
  - rank ordering the one or more assessment results based on their association with the one or more scores; and
  - providing a report that includes the rank ordered list of the one or more assessment results.

23. The network computer of claim 22, wherein generating the one or more assessment results, further comprises:
- generating one or more natural language narratives that describe one or more characteristics of the mark-of-interest based on its assessment and one or more narrative templates; and
- including the one or more natural language narratives in the one or more assessment results.

24. The network computer of claim 22, wherein providing the report, further comprises, generating one or more other visualizations that are associated with one or more of the one or more assessment models, the one or more assessment results, or the mark-of-interest.

25. The network computer of claim 22, wherein the one or more processors execute instructions that perform actions, further comprising:
- monitoring feedback information that is associated with the report;
- providing one or more other scores based on the feedback information; and
- employing the one or more other scores to determine one or more modifications to the one or more assessments results.

26. The network computer of claim 22, wherein the one or more processors execute instructions that perform actions, further comprising, filtering the one or more assessment results based on the one or more scores, wherein each assessment result associated with a score that is less than a defined threshold value is excluded from the report.

27. The network computer of claim 22, wherein determining the mark-of-interest further comprises:
- automatically analyzing the one or more values associated with the one or more marks; and
- determining the mark-of-interest based on the automatic analysis.

28. The network computer of claim 22, wherein the one or more processors execute instructions that perform actions, further comprising:
- evaluating data associated with the mark-of-interest that is included in the data source and omitted from the visualization; and
- generating a portion of the one or more assessment results based on the evaluation.

* * * * *